(12) United States Patent
Erdfarb et al.

(10) Patent No.: US 12,367,398 B1
(45) Date of Patent: Jul. 22, 2025

(54) SOFTWARE-ASSISTED SYSTEM AND METHOD FOR LOCATING, EVALUATING AND CREATING MARKET-STANDARD DOCUMENTS

(71) Applicant: ELAIN, INC, Newark, DE (US)

(72) Inventors: Tamar Erdfarb, Astoria, NY (US); Murilo Venturin, Vila Nova de Gaia (PT); Filipe do Rego Barros Luz, Kitchener (CA)

(73) Assignee: ELAIN, INC, Newark, DE (US)

( * ) Notice: Subject to any disclaimer, the term of this patent is extended or adjusted under 35 U.S.C. 154(b) by 0 days.

(21) Appl. No.: 18/620,678

(22) Filed: Mar. 28, 2024

(51) Int. Cl.
  *G06F 16/00*  (2019.01)
  *G06F 16/903*  (2019.01)
  *G06N 5/01*  (2023.01)

(52) U.S. Cl.
  CPC .............. *G06N 5/01* (2023.01); *G06F 16/903* (2019.01)

(58) Field of Classification Search
  CPC ......... G06F 16/903; G06F 40/40; G06N 5/01; G06N 20/00; G06N 5/04; G06Q 30/0283; G06Q 50/18; G06Q 30/04; G06Q 10/10; G06Q 30/0213; G06Q 30/0207; G06Q 20/12; G06Q 30/0601; G06Q 30/0206; G06Q 30/0615; G06Q 10/107; G06Q 20/127; G06Q 10/109; G06Q 20/145; G06Q 50/01; G06Q 10/087; G06Q 10/101; G06Q 50/188; G06Q 50/182; H04L 63/0428; H04L 65/1069; H04L 51/04; H04L 67/10
  See application file for complete search history.

(56) References Cited

U.S. PATENT DOCUMENTS

| | | | |
|---|---|---|---|
| 11,526,848 | B2 | 12/2022 | Khokhar |
| D994,698 | S | 8/2023 | Khokhar |
| D994,699 | S | 8/2023 | Khokhar |
| 2024/0078622 | A1* | 3/2024 | Arney ................. G06Q 10/101 |
| 2024/0428354 | A1* | 12/2024 | Poon .................. G06Q 30/0283 |
| 2025/0022023 | A1* | 1/2025 | Herken ................ G06Q 10/10 |

\* cited by examiner

*Primary Examiner* — Yicun Wu
(74) *Attorney, Agent, or Firm* — Vedder Price P.C.

(57) ABSTRACT

The present disclosure relates to software, mobile app, or product powered by a machine learning model capable of making recommendations about market-current documents to a user in response to a prompt or query by ingesting text from a corpus in a public database, isolating discrete text elements within the corpus, embedding information from the discrete text elements into vector format, storing the embedded information in vector database, and retrieving the embedded information from the vector database in response to a user query.

10 Claims, 24 Drawing Sheets

Here's Your Elain-Powered Cross Reference Chart 1110(b) 1120(a)
Take A Look Below, Review, And Compare.

|  | CytomX Therapeutics, Inc.<br>May 23, 2014 | BridgeBio Pharma, Inc.<br>Sep 28, 2016 |
|---|---|---|
| Intellectual Property/ Proprietary | Trademarks 10.1 Product Trademarks. BMS Shall Be Solely Responsible For The Selection (Including The Creation, Searching And Clearing), Registration, Maintenance, Policing And Enforcement Of All Trademarks Developed For Use | Patent Marking 22.1 the Licensee Will Mark All Licensed Products made, Used Or Sold Under The Terms Of This Agreement Or Their Containers In Accordance With The Applicable Patent Marking Laws. |
| License Grant | Grant Of Rights And Licenses 7.1 License To BMS. (a) Subject To The Terms And Conditions Of This Agreement, CytomX Hereby Grants To BMS An Exclusive (Even As To CytomX) License, With The Right To Grant Sublicenses As Provided In Section | Grant 2.1 Subject To The Limitations And Other Terms And Conditions Set Forth In This Agreement Including The License Granted To The United States Government And Those Reserved By The Regents Set Forth In The Background And In paragraphs |
| Limitation Of Liability | Indemnification And Limitation Of Liability 15.1 Indemnification By CytomX For Third Party Claims. CytomX Shall Defend, Indemnify, And Hold BMS, Its Affiliates, And Their | Limitation Of Liability 20.1 Except As Set Forth In Section 24 (Indemnification), Neither Party Will Be Liable For Any Lost Profits, Costs of Procuring |

← Back

  This Is A Demo. It Is Subject To Change. 

← Back To Cross Reference-Chart

License Grant

Grant Of Rights And Licenses 7

.1 License To BMS. (a) Subject To The Terms And Conditions Of This Agreement, CytomX Hereby Grants To BMS An Exclusive (Even As To CytomX) License, With The Right To Grant Sublicenses As Provided In Section 7

.2, Under The Product Specific Patents To Research, Develop, Make, Have Made, Use, Sell, Offer For Sale, Export And Import (Including The Exclusive Right To Develop, Have Developed, Commercialize And Have Commercialized) Compounds, Alone Or As Incorporated In Products In The Territory (Including, For Clarity, The Masks And Antibodies Set Forth On Schedule 1.30, Or Any Compounds Comprising Such Materials); Provided That BMS Covenants To CytomX That BMS, And Its Affiliates And Sublicensees, Shall Only Practice Under Such Exclusive License in The Field In The Territory. (b) Subject To The Terms And Conditions Of This Agreement, CytomX Hereby Grants To BMS An Exclusive (Even As To CytomX) License, With The Right To Grant Sublicenses As Provided In Section 7

.2, Under The CytomX Technology To Research, Develop, Make, Have Made, Use, Sell, Offer For Sale, Export And Import (Including The Exclusive Right To Develop, Have Developed, Commercialize And Have Commercialized) Compounds, Alone Or As Incorporated In Products, In The Field In The Territory. (c) BMS (Working 1410(a)

FIG. 14

Submit Feedback 

License Grant

License Grant 2

.1 License Grant Of Patent Rights. Subject To The Terms And Conditions Of This Agreement, PFIZER Hereby Grants To LICENSEE An Exclusive, Royalty-Bearing Right And License Under The Patents Rights To Use The Product Within The Territory Subject To The Terms And Conditions Of This Agreement, PFIZER Hereby Grants To LICENSEE A Royalty-Bearing Right And License Patents For The Purpose Of The Development And Commercialization Of The Product In the Within The Territory.2

.2 Retained Rights, LICENSEE Acknowledge And Agrees That PFIZER Retains The Right To Make, Have Made And Use The Product For Any Other Purpose.2
.3 Residual. PFIZER May Use For Any Purpose The Residuals Resulting From Access To Or Work With The Product And Know-How. As Used Herein, "Residuals" Means Information In Non-Tangible Form Which May Be Retained By Persons Who Had Access To The Product And Know-How, Including Ideas, Concepts, Know-How Or Techniques Contained Therein. 2
.4 No Additional Rights. Nothing In this Agreement Shall Be Construed To Confer Any Rights Upon LICENSEE By Implication, Estoppel, Or Otherwise As To Any Technology Or Intellectual Property Rights Of PFIZER Or Its Affiliates Other Than The License Patents, Regardless Of Whether Such Technology Or Intellectual 1410(b)

FIG. 14 (Continued)

● This Is A Demo. It Is Subject To Change.                    Submit Feedback

1500 ⟶ Definitions                                                                    ↑

1500(a) ⟶ Field Of Use
          [Any And All Uses [In Humans] ]                                             ⋯

1500(b) ⟶ Term
          The License Agreement Will Begin On The Effective                           ⋯
          Date And Will Expire Upon Expiration Of The Last 1500(c) ⟶ Patent Rights
          Means Licensor's Rights Under The Following: (a) The                        ⋯
          Patents And Patent Applications Listed In Exhibit A;

1500(d) ⟶ License To Improvements                                                     ⋯
          Licensor Shall Disclose To Licensee All
          Improvements Made In The Laboratory Of Principal        ┌─────────────────────────────────────┐
                                                                  │ Show License To Improvements Sections│
1500(e) ⟶ License                                                 │ Edit Section                        │
          Licensor Grants To Licensee An Exclusive License        │ Remove From Term Sheet              │
          Under The Patent Rights, And A Non-Exclusive            └─────────────────────────────────────┘

+ Add Section    ⬇ Download                             ◎ View Term Sheet

⚙ 🌐 This Is A Demo. It Is Subject To Change.    1810

Governance

Research Program. Joint Steering Committee. (a) The Parties Hereby Establish A Joint Steering Committee (The "Joint Steering Committee" Or "JSC") In Order To Facilitate And Oversee The Research Program And Such Other Matters As The Parties May Agree In Writing From Time To Time. The JSC's Responsibilities Shall Include, At Least [*] During Each Contract Quarter: (i) Reviewing Interim Data And Required Reports, (ii) Monitoring, Planning And Coordinating The Research Conducted Under The Research Program, (iii) Updating And Modifying The Research Program Workplan As Necessary, (iv) Facilitating The Disclosure And Transfer Of Intellectual Property And Materials Among The Parties As Required For The Conduct Of The Research Program, And (iv) Performing Such Other Activities As The Parties Agree In Writing Shall Be The Responsibility Of The JSC. The JSC Shall Operate By Consensus, But If The Members Of The JSC Should Be Unable To Come To Agreement On Any Issue Submitted To The JSC, [*] Shall Have Final Decision-Making Authority. For Clarity, The JSC Shall Not Have Any Authority To Modify The Terms Of This Agreement. (b) The JSC Shall Be Comprised Of At Least One (1) Named Representatives Of Each Of Alnylam, UBC And AlCana, Or Such Other Number Of Representative As The Parties Shall From Time To Time Agree. Each Party Shall Appoint Its Respective Representatives To The JSC From Time To Time, And May Substitute One Or More Of Its Representatives, In Its Sole Discretion, Effective Upon Notice To The Other Parties Of Such Change. Each Party's Representative Shall Be A Senior Employee (Director Level Or Above), And All Representatives Shall Have Appropriate Expertise And Ongoing Familiarity With Research Program. Additional Representatives Or Consultants May From Time To Time, By Mutual Consent Of The Parties, Be Invited To Attend JSC Meetings, Subject To Such Representatives' And Consultants' Written Agreement To Comply With Confidentiality Obligations No Less Stringent Than Those In Agreement. The Chairperson Of The JSC Shall Be A Representative Of [*]. The Chairperson's Responsibilities Shall Include Scheduling Meetings, Setting Agendas For Meetings With Input Solicited From Other Members And Confirming And Delivering Minutes To The JSC For Review And Final Approval. (c) The First JSC Meeting Will be Held Within [*] Days After The Effective Date, And The JSC Shall Meet In Accordance With A Schedule Mutually Agreed By The Parties, But No Less Frequently Than [*] Per Contract Quarter During The Research Term, With The Location For Such Meetings As The Parties May Agree. Alternatively, The JSC May Meet By Means Of Teleconference, Videoconference Or Other Similar Communications Equipment. All Meetings Of The JSC Shall Take Place In English. Each Party Shall Bear Its Own Expenses Relating To Attendance At Such Meetings By Its Representatives, Except That Alnylam Agrees To Reimurse UBC For Reasonable Travel

[← Back] [Show More Results]

FIG. 18

SOFTWARE-ASSISTED SYSTEM AND METHOD FOR LOCATING, EVALUATING AND CREATING MARKET-STANDARD DOCUMENTS

FIELD OF THE DISCLOSURE

The present disclosure relates to a system and method to assist an individual to locate, evaluate and draft market-standard documents.

BACKGROUND

The preparation of legal documents between parties is complex. Each document must be individually tailored to the needs of the specific parties seeking to enter into an agreement or commercial or legal relationship. A particular legal document must reflect the specific conditions of the individual parties, including entity size, the number and type of entities involved, the nature of the agreement, relevant dates, and account for any sector-specific regulations and terms. Additionally, preparing market-standard documents requires the time and expertise of multiple attorneys with industry-specific knowledge and experience. This process is costly and time-consuming. To add to the complexity, industry-specific regulations, and legal decisions about whether contract terms or provisions are enforceable are constantly changing as policymakers enact new laws and as courts issue new legal opinions. These factors make it impossible for contracting parties or their attorneys to wholly rely on pre-existing contract templates.

Additionally, depending on the size, complexity, and criticality to the parties, negotiating the specific provisions of a legal document can be costly, time-consuming, and even confrontational. Parties who take diametrically opposed and unreasonable positions can contribute to that expense and acrimony. Current processes to identify reasonable, market-standard terms that would streamline the agreement drafting and negotiation process are insufficient and for all practical purposes unavailable. Typically, to prepare a new legal document among parties, a drafting attorney will be limited to precedent documents the attorney or the attorney's firm has used before. Attorneys are unable to easily identify the universe of comparable documents without extensive market research. This leads to attorneys starting with the same unreasonable documents over and over, or stale documents that have not accounted for changes in law or market standards. It may also lead to attorneys creating first drafts based on heavily negotiated terms with the inability to back out those negotiated terms to a more neutral, market-standard approach. These attorneys have a need to get out of their own or their own firm's bubble to find the right starting terms for an efficient agreement negotiation and transaction. And, even if an attorney locates potential good-fit documents, it may take that attorney up to fifty hours of billable time to compile the various sources into an acceptable starting term sheet or initial legal document draft, all at great cost and possible limited benefit to the client. A need, therefore, exists to streamline the process of creating market-standard terms for legal documents between parties.

Machine learning models (MLM) and artificial intelligence (AI) programs offer a potential solution. MLMs can be trained to make predictions in novel situations based on recognized patterns. One means of training an MLM to analyze text is through vector format text embedding. Text embedding refers to mathematically representing a word, concept, or idea in vector format, such that the similarity of two words, concepts, or ideas can be numerically compared in a vector space or database. With appropriate training, an MLM can access and retrieve information stored in a vector format in response to a query from a user and make a recommendation in response to the query based on the accessible information stored in vector format or a database.

Word embedding, as is understood in the art, is the process of representing a word with a valued vector encoded to communicate the meaning of the word such that words with similar characteristics, usage, or meanings are encoded to be closer to one another in a given multi-dimensional vector space. Word embedding improves natural language processing in machine learning systems, particularly in the context of syntactic parsing analysis and sentiment analysis. To assign meaning to a word, embedding models analyze the distributional semantics of the body of text based on the assumption that text with similar meaning will occupy similar vector spaces and distributions. There are two general word embedding methodologies: vector encoding for co-occurring words and vector encoding for the context in which words appear.

There are multiple strategies to embed text into vector format. Many natural language processing systems can obtain vector representation of words based on their usage in context. To do so, modeling systems analyze a word's usage within a large corpus of text. This trains a model to detect similar words and allows the model to represent each word with a distinct vector value to represent similar usage. In this way, by analyzing a set of vectors, the similarity between two words can be calculated by the cosine similarity of their related vectors. Cosine similarity is a measure of the angular distance between two vectors in a multi-dimensional vector space without regard to vector magnitude. A higher cosine measurement indicates a higher degree of similarity between the two words (or concepts) represented by the vectors (i.e., $\cos 0=1$).

Word embedding models are capable of analyzing word similarity, however, many of these models lack context awareness. For example, one common method, term frequency-inverse document frequency embedding (TF-IDF) analyzes a word's occurrence in a particular document (or text subsection) as compared to that word's occurrence throughout an entire corpus of text. TF-IDF embedded vectors, therefore, can communicate how relevant a particular word may be but cannot provide additional context or meaning to a word or group of words. Likewise, so-called Bag-of-Words embedding simply transforms a word's occurrence in a text (but disregards whether the word occurs throughout the corpus) into vector format. Like TF-IDF, Bag-of-Words embedding can identify a word's relevance without significant computational power or training requirements but fails to assign context or meaning to a word when a word is transformed into vector format.

The concept of individual-word embedding can be extended to entire sentences, paragraphs, or whole documents. These methodologies are more complex and consider more than a word's usage or occurrence in a single document or corpus of works. Conceptual embedding techniques look to other elements of a text and the relationship between words to identify ideas to represent more than a single word. Such embedding encodes the meaning, concept, or sentiment of a body of text into a single vector to communicate information with semantic and syntactic meaning.

One simple approach to embed an entire body of text into vector format is aggregate word embedding, in which each word in a body of text is embedded in vector format and the average vector value for all words in a given body of text is calculated to determine the overall semantic information contained within the body of text. Other embedding models consist of layer mapping each input word to a vector and then an averaging layer to produce a final vector value. Other natural language processing models can refine the text embedding to provide context or meaning. For example, Word2vec uses multiple layers of information to provide context and semantic meaning to a vector. Word2vec analyzes local information around a particular word to make contextual predictions. GloVe embedding is similar to Word2vec embedding but incorporates additional data and statistics from an entire corpus to generate vectors.

Transformer architecture models, such as Google's BERT model, split text from a body of work into individual words which are embedded in vector format and then contextualized based on token weighting within the context window (also known as window text sampling) of a particular data layer. By encoding additional context into a vector, machine learning models have an increased ability to learn which inputs should be closer to a predicted output in a given vector space. There are many text embedding protocols, and none are currently positioned to become a universal system. Instead, a patchwork of embedding systems currently exist, with no clear guidance as to which system is most appropriate for a given task or set of tasks.

These embedding methodologies each have advantages and drawbacks depending on the tasks or goals of the machine learning system. In other words, the embedding technique best suited for a given task will depend just as much on the embedding methodology as the task itself. Common tasks a machine learning system may be asked to execute include: bitext mining, which identifies a best match between two sets of sentences; classification, which, as discussed below, entails training an MLM on a training dataset, refining the input and weighting parameters in order to make predictions about a novel dataset; clustering, which, as discussed below, identifying common themes among dataset, generally by an untrained MLM; ranking/reranking, which compares an input query to a set of texts; retrieval, which is identifying relevant texts from a corpus accurately and quickly; semantic text similarity, which analyzes similarity between two text sources; and summarization. Some of these tasks can be accomplished without supervised or semi-supervised learning, while others require extensive training and fine-tuning to be effective. Further, computing costs and times vary depending on task and embedding protocol.

Even when an appropriate MLM is engineered, the AI output will only be as good as the data on which it is trained. Therefore, preferred models will rely on large legal document databases. In addition, a need exists for large legal document databases that consist of final, agreed-to documents, as opposed to drafts and interim versions, because those documents are likely to reflect an agreed-upon result that evidences the then-current market standard, especially when the sample size of such documents is sufficiently large.

Together, these factors make it difficult to use any existing embedding methodology as a one-size-fits-all solution or to perform a novel task. Therefore, there is a long-felt but unmet need for a reliable, efficient, and cost-effective means of creating market-standard contract documents that reflect the changing legal and regulatory landscape based on concept-embedded vectors derived from a reliable corpus of relevant text.

SUMMARY

The present disclosure relates to a system and method to generate market-standard commercial, corporate, or transactional documents based on user-selected inputs and generated based on an ingested corpus of work from a publicly available database of documents which have already been independently vetted and agreed to by corporate entities.

In one aspect of the disclosure, ingested documents from a public database are analyzed to identify and extract discrete contract terms, sections, subsections, headers, metadata, definitions, titles, subtitles, and other relevant information. The disclosed system analyzes these discrete elements to determine each element's relationship to each other element, and where appropriate, text from the documents are embedded in vector format. Text from the documents are embedded in vector format to represent semantic and syntactic information about and from the source text. The disclosed system is capable of embedding specific, individual words, sections, paragraphs, titles, definition, and entire text. The vector-embedded text and other discrete document elements are compiled in a relational database configured to generate market-current document terms and sections based on a user input or query.

In an aspect of the disclosure, a method of creating a term sheet of market-standard terms for a legal document of a particular type comprises: ingesting a plurality of agreed-to legal agreement documents from a public database external to a user's personal database, the agreed-to transaction documents comprising common contract concepts, the common contract concepts comprising contract terms related to the contract concept, ingesting metadata relating to each of the agreed-to transaction documents, training a machine learning model on the plurality of ingested documents and contract concepts, using one or more computer processors programed to run an artificial intelligence program based on the machine learning model to generate a plurality of vectors for one or more contract terms found in one or more of the transaction or legal documents, using the machine learning model to relate the plurality of vectors to each other in a contract term and contract concept database by calculating a similarity coefficient between the vectors, the similarity coefficient is calculated based on a predicted relationship between the text of the contract terms, then ranking, by the one or more processors, the set of contract terms based on the similarity coefficients of the contract term search results to create a set of market-standard contract terms related to each contract concept for one or more types of transaction document and outputting to the user, in response to a query for a document type, a market-standard set of contract terms is disclosed.

It is a further objective of the invention to create a system and method that relies on a specific type of source database with unique MLM processes to extract a specific type of term (e.g., a market-standard term or clause) and to utilize a specific AI implementation that cannot be implemented by conventional means on a general purpose computer, to compile the same into a term sheet of market-standard terms or clauses, including for example with embedded definitions and links preserved within the term sheet.

Accordingly, it is an objective of the disclosure not to encompass within the disclosure any previously known product, process of making the product, method of using the product, or method of treatment such that applicant reserves the right and hereby discloses a disclaimer of any previously known product, process, or method. Applicant further notes that the present disclosure does not intend to encompass within the scope of the disclosure any product, process, or making of the product or method of using the product, which does not meet the written description and enablement requirements of the United States Patent and Trademark Office (35 U.S.C. § 112, first paragraph) or the EPO (Article 83 of the EPC), such that Applicants reserve all applicable rights and hereby disclose a disclaimer of any previously described product, process of making the product, or method of using the product.

It is noted that in the present disclosure and particularly in the claims and/or paragraphs, terms such as "comprises," "comprised," "comprising" and the like can have the meaning attributed to them in U.S. patent law; e.g., they can mean "includes," "included," "including," and the like; and that terms such as "consisting essentially of" and "consists essentially of" have the meaning ascribed to them in U.S. patent law, e.g., they allow for elements not explicitly recited, but exclude elements that are found in the prior art or that affect a basic or novel characteristic of the invention.

These as well as other embodiments are hereby disclosed or are obvious to one of ordinary skill in the art from and encompassed by the following figures/drawings and detailed description.

DESCRIPTION OF FIGURES

FIG. 5 is an additional depiction of an embodiment of the user interface of the disclosed system to show additional features of the section analysis tool which a user can assess to review market-standard sections of relevant legal documents.

FIG. 8 is an additional depiction of an embodiment of the user interface of the disclosed system to show additional features of the cross-section chart builder tool which a user can access to compare market-standard document sections.

FIG. 10 is an additional depiction of an embodiment of the user interface of the disclosed system to show additional features of the cross-section chart builder tool which a user can access to compare market-standard document sections.

FIG. 11 is an additional depiction of an embodiment of the user interface of the disclosed system to show additional features of the cross-section chart builder tool which a user can access to compare market-standard document sections.

FIG. 13 is an additional depiction of an embodiment of the user interface of the disclosed system to show additional features of the cross-section chart builder tool which a user can access to compare market-standard document sections.

FIG. 14 is an additional depiction of an embodiment of the user interface of the disclosed system to show additional features of the cross-section chart builder tool which a user can access to compare market-standard document sections.

FIG. 15 is an additional depiction of an embodiment of the user interface of the disclosed system to show additional features of the term sheet creator which a user can access to create market-standard term sheet documents.

FIG. 16 is an additional depiction of an embodiment of the user interface of the disclosed system to show additional features of the term sheet creator which a user can access to create market-standard term sheet documents.

DETAILED DESCRIPTION

Database Retrieval and Document Ingestion

Figure 1:
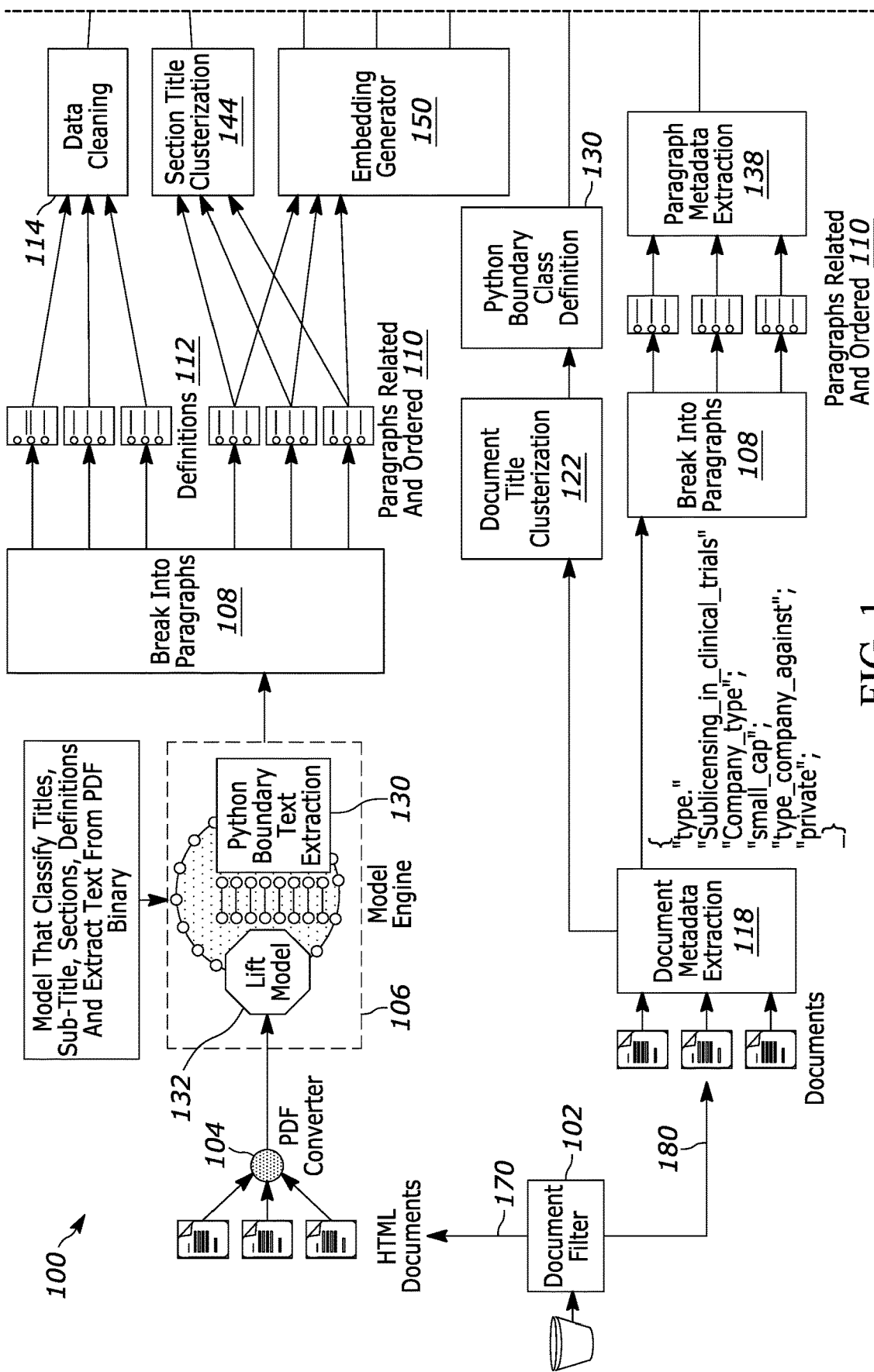
FIG. 1 is an illustration of an embodiment of the present disclosure depicting document text and metadata extraction, embedding, and compiling in a relational database.
Figure 1:
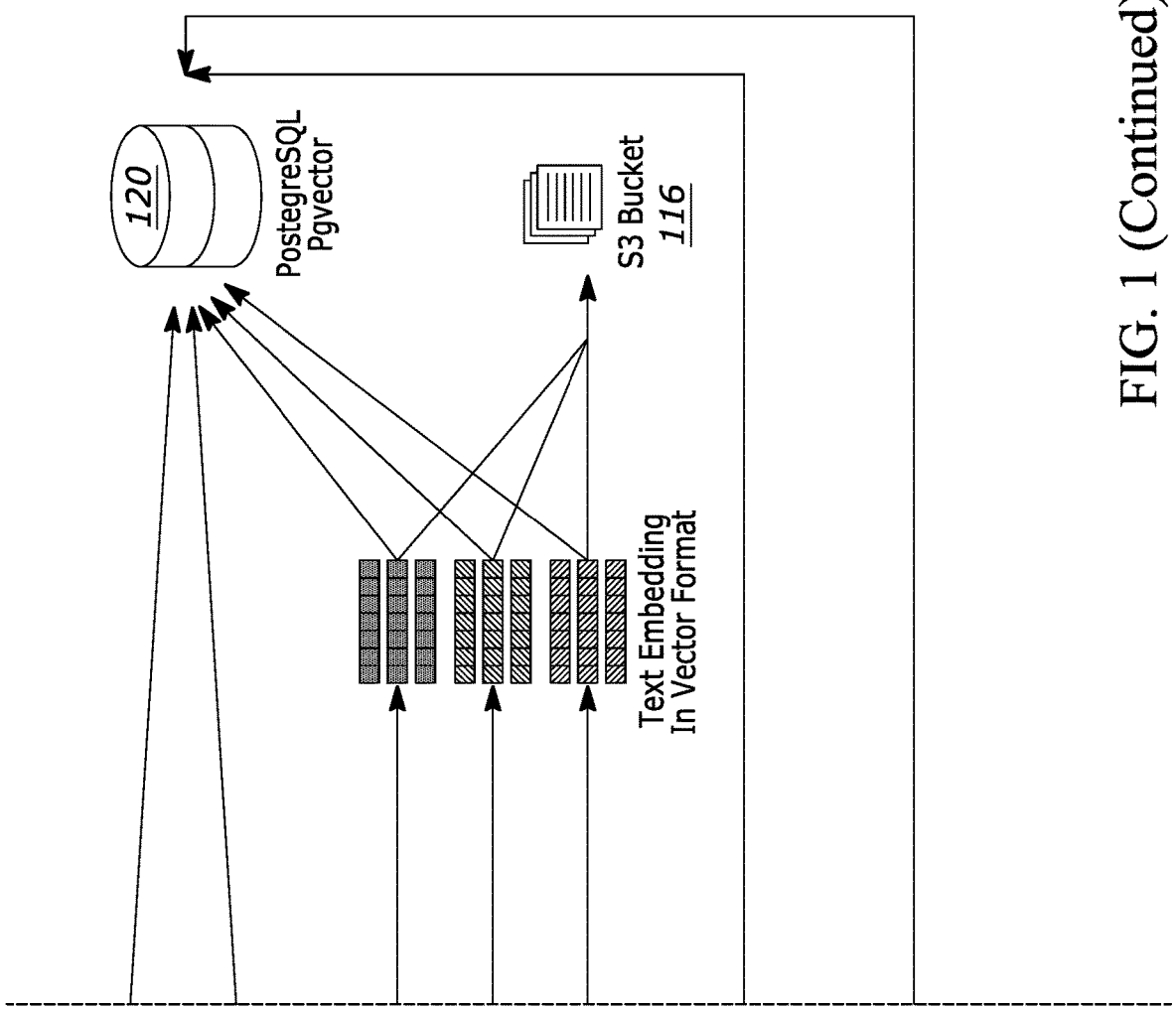

Although legal documents are complex, many of these documents have standardized, labeled sections, headers, titles, and subsections which are found in nearly all legal documents. The present disclosure is a software powered by a machine learning model that allows for the ingesting of an external, defined corpus of text, such as a publicly available database of legal documents to analyze contract concepts, terms, definitions, sections, or other legal commercial, corporate, or transactional document features, embed those features in vector format, and then make predictions and recommendations to a user about which terms, sections, or other document features are important to include in a new legal document based on the market-current terms and definitions without relying on tedious research.

In an embodiment, one corpus of text which can be ingested into the disclosed system is the Electronic Data Gathering, Analysis, and Retrieval (EDGAR) database, which is maintained by the United States Securities and Exchange Commission (SEC). Any company required to file disclosure forms with the SEC must do so via the EDGAR database. Documents filed on the EDGAR database are publicly available. The documents uploaded to EDGAR represent the most current and updated information in a relevant sector and therefore, these documents are a reliable source for market-current terms, definitions, and sections for each type of document uploaded to the database.

Over 3,000 disclosures and legal documents are uploaded to EDGAR daily. Each of these documents can be many hundreds of pages long. Because of this, EDGAR contains millions of documents from companies across all market sectors with a wealth of industry-specific legal agreements and disclosures. Moreover, this wealth of information about thousands of companies is publicly available and free to access on the EDGAR database website. However, the EDGAR website is outdated and not user-friendly, making it difficult to manually download or review large numbers of documents.

The disclosed software utilizes a machine learning model that is capable of accessing and ingesting documents from the EDGAR database. In an embodiment, the disclosed machine learning model can ingest documents from a particular sector. In an alternative embodiment, the disclosed machine learning model can access the database without the assistance of a human user. In an alternative embodiment, the disclosed machine learning model is capable of ingesting only those documents which are fed to it via a human user. In an alternative embodiment, the disclosed machine learning model has user-selected parameters which impact the scope of documents the MLM ingests, these parameters include, without limitation: date of the document, length of the document, type of document, the document's sector or industry, type of owner or author of the documents (i.e. company or entity type), or any other parameter as may be required to train the MLM to make predictions and recommend market-current legal documents and contract terms.

Although in an embodiment, the disclosed system and method utilizes the EDGAR database to generate market-current legal documents, other embodiments are contemplated wherein the disclosed system and method can ingest any other public database or defined corpus of text.

The disclosed system and method 100 utilize a machine learning model to analyze and ingest publicly available documents from an existing, external database of documents, such as EDGAR, to recommend to a user targeted legal documents with current, market-standard terms, sections, and definitions. The system and method 100 comprises two prongs of ingested document analysis: a document-text analysis prong 170 and a document-metadata analysis prong 180. Machine learning of text within these documents allows the documents to be parsed for discrete text sections (such as definitions, sections, paragraphs, etc.), and for the meaning of these text sections to be embedded in vector format, contextualized, and related to other similar text sections into a relational database 120 and stored in a storage database 116. The disclosed database 120 contains information about the relationship between and among the ingested documents. This information is retrievable from a storage database 116 by the disclosed machine learning model so that the model can recommend to a user market-current terms, definitions, and documents in response to a prompt or query from the user.

FIG. 1 generally depicts both prongs of the disclosed document analysis.

Document-Text Analysis and Embedding

To analyze the text of the documents within a corpus of text, each document is ingested and filtered by the disclosed machine learning system. The documents need to be in a consistent, readable format for the disclosed system to properly analyze the content of the documents, extract text, and create conceptual text-embedded vectors. Depending on the source or database, the documents may be stored in a variety of formats, inconsistent formats, or formats which are non-readable by a machine learning model, or formats which may be more prone to mistakes and misinterpretation when ingested by a machine learning model.

Therefore, a document conversion step 104 is disclosed. Documents retrieved from a preexisting database may be stored in a variety of formats and may require conversion prior to additional analysis. In one embodiment of the present disclosure, the documents are converted into Portable Document Format (PDF) files prior to reading. In alternative embodiments, documents are read in HTML format. Converting the documents into a standard format ensures that the disclosed system is capable of reading the text and identifying key elements to isolate, analyze, relate, and embed in vector format.

Classifiers

After the documents are in a readable format, a machine-learning classifier analyzes the documents 106. The disclosed classifier comprises a language-independent layout transformer (LiLT) 132 and a text extractor 130. The LiLT engine is an analytic tool for document processing. LiLT classifiers utilize a machine learning technique capable of categorizing or ordering data into one or more sets or classes. In general, a classifier works by learning the relationship between an input feature and class or category labels in a training dataset, then applying this learned relationship to a new set of data to make predictions about which class a new set of data belongs to or is most similar to.

Classifiers are typically trained by inputting data in a recognizable format to a machine learning model, selecting relevant characteristics, patterns, features, or identifiers to train the classifier, training the classifier with the data set, and adjusting any parameters to maximize accuracy, assessing performance of the classifier through an F1-score or a similar metric, and running the now-trained classifier to predict new classes or categories of labels from a dataset or novel corpus.

Classifiers may be supervised or unsupervised. A supervised, or semi-supervised, classifier is fed training datasets to detect patterns or characteristics within the dataset in order to classify the data. Unsupervised classifiers are fed only unlabeled data sets. These classifiers classify data based on patterns intrinsic to the data or other distinguishable features or anomalies in the data. All classifiers make predictions about how to characterize an input data in a particular way.

In an embodiment, the disclosed classifier may be, without limitation, a logistic regression classifier, which categorizes data based on multiple independent factors as they impact a single output variable; a decision tree supervised learning algorithms, naïve Bayes supervised probabilistic algorithms, which are based on the Bayes theorem and calculate the likelihood any given data point falls into a set of categories or not; k-means/nearest neighbor pattern recognition algorithms, which analyze how "close" a novel data point is to pre-learned data; support vector training model supervised classifier, which creates "boundaries" around data in multi-dimensional space analysis to create and predict classes; and neural network-based algorithms, such as a perceptron classifier, which is a basic linear classification algorithm.

The classifier in the disclosed system was trained with a dataset to identify the following classes of text: document title, subtitle, headers, sections, subsections, and definitions. Other classes of text, as may be necessary in contract term analysis, and as would be understood by one of ordinary skill in the art, are also contemplated. In an embodiment of the present disclosure, a LiLT engine was utilized to identify language elements.

In an embodiment, a single classifier capable of analyzing multiple document elements is disclosed. In alternative embodiments, a plurality of specialized classifiers may be used to each analyze and classify specific document features. Analysis of the document by a classifier or plurality of classifiers is disclosed as step 106 in FIG. 1.

Text Extraction

After the classifier, or classifiers, have identified the desired document elements, a text extractor identifies and isolates each discrete text element of the document. After the relevant sections have been identified, the text from these sections is extracted by a text extractor program 130. Text extractor programs utilize machine learning algorithms to recognize and structure text from a text source. The text extractor utilizes machine learning outputs to identify and label the position boundary of each class of text within a document. Knowing the boundaries (x,y,w,h positions) allows the system to extract the text from binary.pdf and use the labelled text based on the machine learning model outputs. Text extraction must be accurate in order for a machine learning system to learn the source text accurately. Poor text extraction, poor document layout, or a .pdf that contains only images and not text can result in unreadable, or non-natural language outputs, include unsupported or unreadable characters, or fail to extract all of the text from the source document due to formatting limitations. To avoid these pitfalls, a sophisticated text extractor is disclosed which is capable of accurately extracting relevant text from source documents.

Definition Extraction and Data Cleaning

In an embodiment, any definitions from the source documents extracted from the documents are compiled and cleaned 114. Cleaning refers to the process of cross referencing a set of data to remove any errors, duplications, inaccurate information and replacing, modifying, or deleting any corrupted or incorrect data. In this way, the disclosed system can analyze document definitions from thousands of current documents to determine whether a given set of definitions is accurate and current in a particular market or industry sector. The cleaned document definition data are stored in a relational database 120 and memory storage unit 116.

Title Cluster Analysis

The section title for each paragraph analyzed in step 110 is identified and clustered 144. Clustering refers to a process of data analysis and comparison where a section of objects is grouped together such that objects sharing more traits with each other are positioned near one another and objects that share fewer traits in common are positioned further apart from one another. All objects are grouped or positioned based on their relative similarity to all other objects. Objects which are most similar to each other and distinct from all other objects are more likely to relate to a similar set of data. Cluster analysis is an unsupervised learning algorithm and helpful to identify similarities among a dataset without relying on preselected categories.

Although various clusterization models can be used, in an embodiment, k-means clusterization is used by the disclosed system to group, order, and rank section titles. K-means clusterization is unsupervised and is beneficial when analyzing unlabeled or unclassified data. Additionally, k-mean clusterization does not require any supervised training, making it efficient at quickly reviewing and sorting new datasets. Essentially, data are categorized into k groups or clustered based on relative similarity between the data points. Then, distances and means between each k point are calculated and compared to other k points. This process is repeated iteratively until distinct clusters of similar data points are identified by the algorithm.

Many other clusterization models are contemplated, as will be understood in the art, including, without limitation: connectivity-based clustering, hierarchical clustering, distribution/model-based clustering, density clustering, grid clustering, bi-clustering, fuzzy clustering, canopy clustering, data stream clustering, FLAME clustering, overlapping clustering, strict partitioning clustering, or other enhanced k-means clustering, such as k q-flats clustering, k-means ++ clustering, k-medians clustering, k-medoids clustering, or k-svd clustering.

By clustering section titles for each paragraph, the disclosed system can make determinations about what type of information is relevant for a particular paragraph. The results of the section title clustering 144 are stored in a relational database 120 and memory storage unit 116.

Paragraphs Related and Ordered

In an embodiment, the text extractor is a Python Boundary Text Extractor, but other text extracting protocols are also contemplated. The disclosed text extractor 130 separates the sections of the document into discrete paragraphs 108 based on the designations of the disclosed LiLT classifier. The paragraph may be a single sentence or multiple sentences. The paragraph may be a paragraph from the body of the document, or a definition term used in the document. After each paragraph has been isolated, the paragraphs are related and ordered based on their relationships with other corresponding document elements by the disclosed machine learning model, as disclosed by step 110.

Text Embedding

After the paragraphs have been related and ordered, the text from each paragraph is embedded in vector format. In an embodiment, the text of each paragraph is analyzed with the disclosed machine learning model. Text embedding may include embedding a token, multiple tokens, word, multiple words, sentence, multiple sentences, a document, a concept, or an idea into a multi-dimensional vector. Vector embedding, as is understood in the art, is a numerical representation of a dataset that captures and shows semantic relationships or other similarities in the dataset. Vector embedding allows machine learning models to become more sophisticated. Through text embedding, a machine learning system identifies relationships between concepts, ideas, or texts and uses these learnings to respond to a query for a specific type of information with a novel recommendation. Because the learning is constant, and the source documents are regularly updated and ingested into the disclosed system, analyzed, and embedded, the system is capable of recommending only the most current and updated responses to a user input or query.

In an embodiment of the disclosure, the E5-Large-v2 large language model is utilized to embed text into vector format. E5 embedding is preferred because it is capable of general purpose embedding and is capable of using a single vector representation of a text for retrieval, clustering, and classification. Further, E5 embedding results in low-dimensional vectors, unlike the high-dimensional vectors which result from other embedding methodology, such as TF-IDF. This allows for more efficient retrieval, matching, and versatility. Further, the E5 embedding methodology can be fine-tuned through iterative rounds of supervised training. Generally, an initial, first round of training is required with contrastive unlabeled text pairs. However, a second, or third stage training on information-rich, highly labeled or categorized texts or datasets can improve embedding results.

Individual words or phrases may be embedded. The meaning or concept of each paragraph is represented by a vector in such a way that paragraphs that are closer in vector space are expected to have similar meanings or concepts. In this way, the concept of each paragraph can be assigned a real vector value and that value can be used to determine whether the concept of one paragraph is similar to another.

The disclosed machine learning model uses these vector values to identify similarities between relevant texts, correlate and plot data points to conduct a semantic search or vector search of the resulting vectors. The text-embedded vectors are stored in a relational database 120 and a standard memory storage database, such as an S3 database 116. The relational database 120 and the memory storage database 116 intercommunicate. Relational data is stored in the relational database and the underlying source material is stored in the memory storage database 116. The data stored in the memory storage database 116 may include: documents, titles, sections, html data, or other information extracted from the ingested documents, and preferably includes documents, section text, and html layout data. When a user accesses the disclosed system, based on user inputs, the relational database 120 will identify best-fit documents, sections, and other information extracted from the ingested documents, order and rank those files, and the disclosed system will retrieve those files from the memory storage database 116.

The disclosed embedding generator 150 utilizes MLM algorithms to create the processable text vectors based on the text of the ingested documents. Among other things, the MLM develops the methods for identifying the proper contextual vectors for words and aligns them with the appropriate context. For example, the word "license" may indicate that the surrounding text is a license grant, and therefore represents a market-standard license grant. Alternatively, the word "license" may appear in another clause, such as a representation or warranty that no third-party licenses are needed to perform the contracted-for services. The embedding generator 150 is programmed to differentiate those contexts and contract concepts so that a user ultimately querying the system for a market-standard license grant will be provided the former clause and not the latter. The disclosed system is trained with at least two rounds of training: a first pre-training based on contrastive text with the goal of distinguishing text pairs from other irrelevant or negative valued pairs. After contrastive pre-training, supervised learning fine tunes the disclosed embedding methodology with high information inputs of target documents, sections, definitions, and other texts as might appear in commercial, corporate, or transactional legal documents. Through additional supervised training, the disclosed system can be further fine-tuned to increase its accuracy when embedding text.

Document-Metadata Analysis

Concurrently with the first prong of document-text analysis 170, a second prong of analysis to understand the metadata from each document is disclosed 180. In a second prong of the analysis 180, a document's metadata is analyzed to be used in a relationship database 120 to make recommendations for market-current legal documents to a user in response to a prompt or query.

Figure 2:
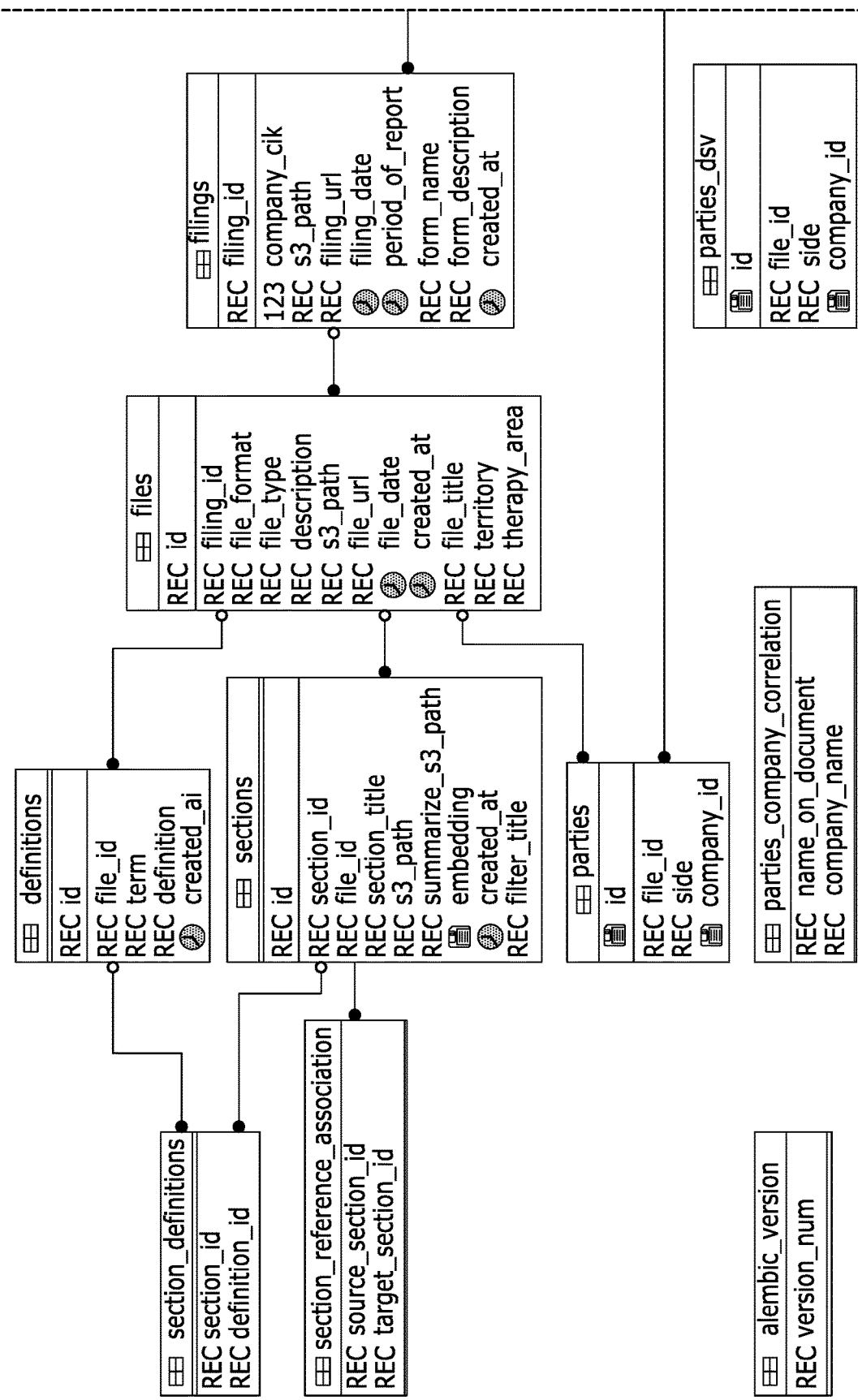
FIG. 2 is an illustration of an embodiment of the present disclosure depicting document metadata analyzed by the disclosed system.
Figure 2:
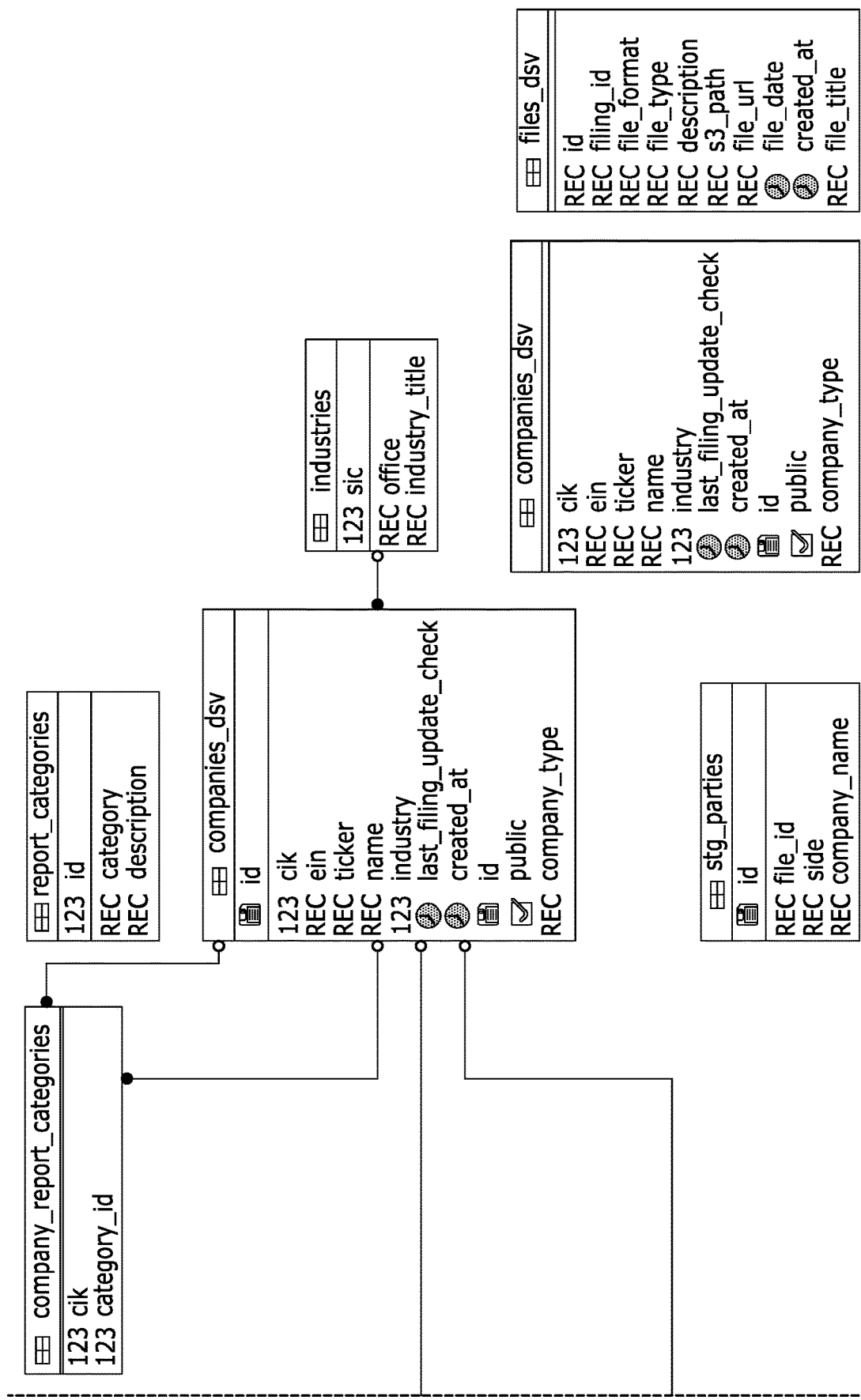

After a document has been ingested and filtered 102, the metadata of the document is extracted 118. The types of metadata that the system might ingest are disclosed in FIG. 2. Such metadata might include: document size, document type, party information, age of document, relationship between the parties, creation date, date of last modification, file name, file size, summary of the document, file format, file type, file description, file URL, file date, file creation date, party name, company name, Federal Employer Identification Number, section term, section definition, name on document, document description, company category, company central index key (CIK), company stock ticker name, company industry, office, industry, last filing update by company, and any other metadata as may be obtained from a publicly filed document. Other metadata may be analyzed as it might be useful and included without departing from the scope of the invention.

Metadata provides additional information to a user when drafting a novel transactional document and can assist the disclosed machine learning model to make more accurate and informed recommendations to a user.

Once the metadata has been extracted, the document title is clustered 122 and processed through a Python boundary class protocol 130 to categorize the document and the results are stored in a relational database 120. Under the second prong of analysis 180, the text of the document is separated into paragraphs 108 and the paragraphs are related and ordered 110 in a substantially similar method as under the first prong analysis. After all of the paragraphs have been related and ordered 110, the metadata of the paragraphs is extracted and stored in a relational database 120 and memory storage unit 116.

The Relational Database

Ingested documents from a public database are analyzed to identify and extract discrete contract terms, sections, subsections, headers, metadata, definitions, titles, subtitles, and other relevant information. The disclosed system analyzes these discrete elements to determine each element's relationship to each other element, and where appropriate, text from the documents is embedded in vector format. Text from the documents is embedded in vector format to represent semantic and syntactic information about and from the source text. The disclosed system is capable of embedding specific, individual words, sections, paragraphs, titles, definition, and entire text as vectors in the relational database 120.

The vector-embedded text and other discrete document elements (such as titles, sections, or definitions, for example) are compiled in a relational database configured to generate market-current document terms and sections based on a user input or query. All information gathered by the disclosed software may be compiled in the relational database 120, including the results from clusterization analysis, cosine similarity, metadata information, and definition data.

In an embodiment, the relational database 120 is a structured query language (SQL) database. An SQL database is a relational database, capable of storing structured data to show relationships between the stored data. In an embodiment, the SQL database contains rows and columns to show relationships between data points. The disclosed relational database 120 receives information about a legal document, including the definitions, section titles, document titles, document sections, related metadata, and relates this information to the conceptual meaning generated from text-embedded vectors, i.e., information from the parallel processes 170 and 180 are merged into the database 120.

This information is then retrievable by the disclosed machine learning system in response to a user prompt or query. For example, a user may query the disclosed system for market-current term sheet for a highly specific or niche industry. Based on the user's query or input, the disclosed system can vectorize the input, compute a vector search of the database for a related solution with a higher cosine similarity measurement, and recommend to a user information from the database that is the most similar to the user's inputs. Because the relational database 120 is constantly updated with new input documents (such as new filings from the EDGAR database, or other database), the recommendations put forth by the disclosed system will be as current and the most recent input documents.

The disclosed machine learning model regularly ingests new documents and datasets from the EDGAR database. Documents may be ingested weekly, daily, hourly, or at a near continuous rate, as may be required. This allows the disclosed machine learning model to remain market current with all relevant legal definitions, terms, and documents. The information recommended by the system can inform a user which document or contract sections, titles, paragraph types, definitions, and concepts are most similar or current to the user's input selections or query.

Moreover, the disclosed machine learning model can utilize the relational database to further prompt a user with targeted questions or recommendations to identify and generate specific documents, document types, term sheets, or other legal documents based on the user's initial inputs or queries. This allows the disclosed machine learning model's recommendations to become more targeted, and therefore, more industry-specific and useful to a user.

Once the documents have been ingested and associated in the database per the above processes and systems, a user can query the system to provide a market-standard term sheet.

The present invention may be implemented with various additional features or embodiments to enhance the MLM, for example, through a recursive learning model. For example, and without limitation, the system can learn from user inputs and selections and continually improve the accuracy of its outputs to find the most commonly suitable or desired, or most perceived to be market standard, agreements, and sections. The system may also include private user accounts to save work in a secured and dedicated, e.g., password-protected, storage space on one or more hosted servers.

User Experience

The disclosed system allows a user to interact with a user interface 300. The user interface 300 facilitates a user accessing market-standard sections, terms, definitions, and documents. The disclosed system allows a user to navigate a home page, shown in FIG. 3, and can select one of four related options: section analysis 310 (labeled as "Show me sections"), a cross-reference chart builder 330 ("Build me a cross-reference chart"), term sheet creator 340 ("create a term sheet"), and access to a data room 320 ("I want to see a data room"). Each of these options is related to allow the sections of a legal document can be reviewed in the section analysis 310 tab. These sections can be compared with one another across various market-related metrics in the cross-reference chart builder 330. The term sheet creator 340 can scour sections from the section analysis tab 310 or cross-reference chart builder 330 to show a user market-standard terms or definitions as they are actually used throughout the targeted or selected sections by identified companies or company types. A user can review the source document or documents for any particular section or term in the data room 320. Each of these options are interrelated and described in greater detail below and in FIGS. 3-18.

In general, the section analysis 310 feature of the disclosed system allows a user to analyze user-selected sections of legal documents to identify market-standard versions of those sections. The reference chart builder 330 allows a user to directly compare sections across similar industries, companies, transactions, or other parameters to readily illustrate any potential differences or similarities between legal documents for each document section. The term sheet creator 340 allows a user to prepare a draft set of contract or document terms based on specific parameters to ensure the resulting term sheet is current and market standard. Finally, the data room 320 permits a user to review relevant source documents.

Section Analysis

Figure 3:
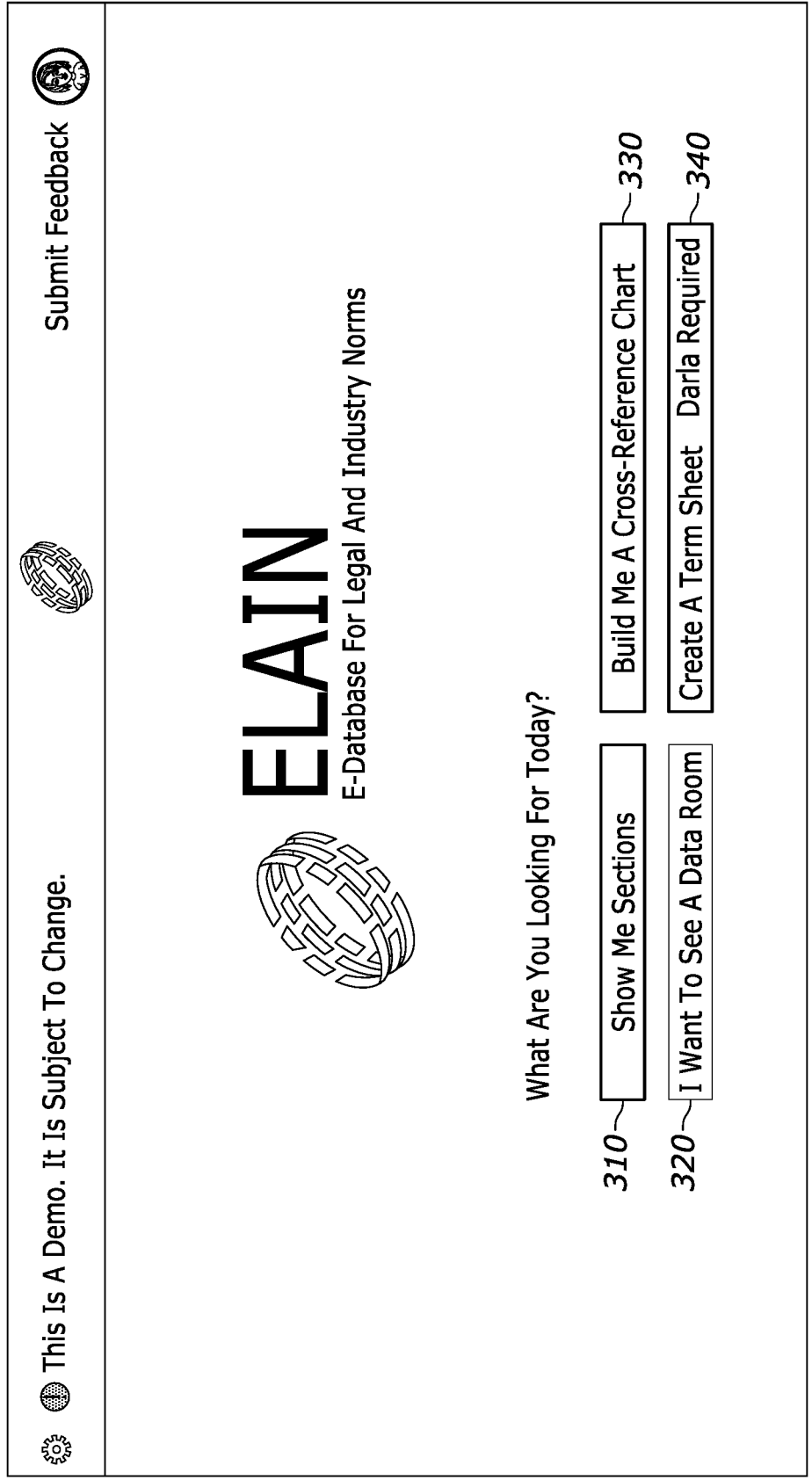
FIG. 3 is a depiction of an embodiment of the user-interface and related features of the disclosed system.

When a user selects the "Show me sections" section analysis 310 option, as depicted on FIG. 3, the user will be prompted with additional options to narrow their search. The section analysis 310 feature allows a user to identify and compare sections of existing and agreed-to legal documents from a public database, such as EDGAR. With the correct query, a user can be shown relevant sections from legal documents by the disclosed system. This can allow a user to review targeted sections of legal documents quickly and efficiently in order to tailor a novel legal document section by section to achieve an optimal overall agreement.

Figure 4:
FIG. 4 is an additional depiction of an embodiment of the user-interface of the disclosed system to show additional features of the section analysis tool which a user can assess to review market-standard sections of relevant legal documents.
Figure 5:
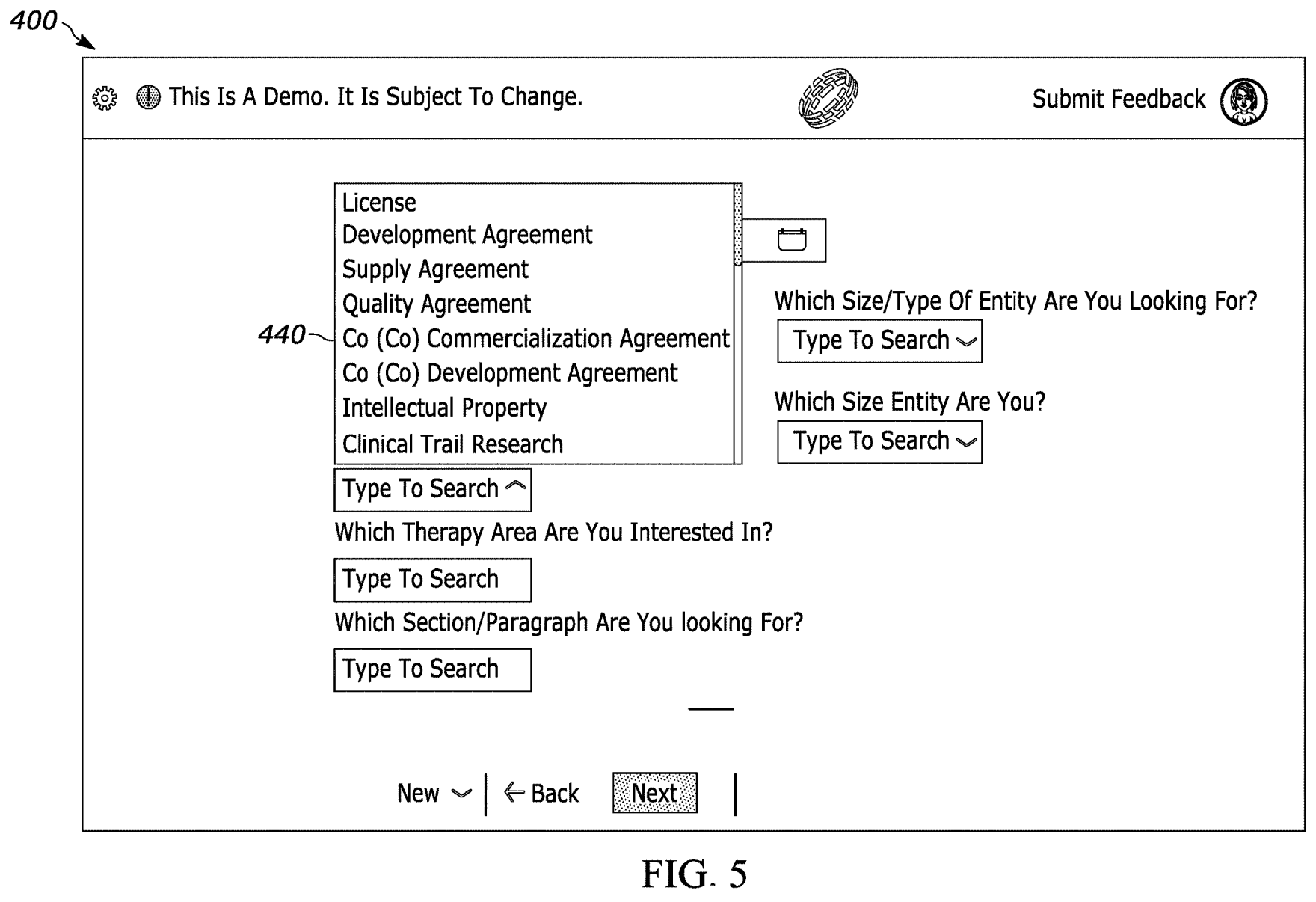
Figure 6:
FIG. 6 is an additional depiction of an embodiment of the user interface of the disclosed system to show additional features of the section analysis tool which a user can assess to review market-standard sections of relevant legal documents.
Figure 7:
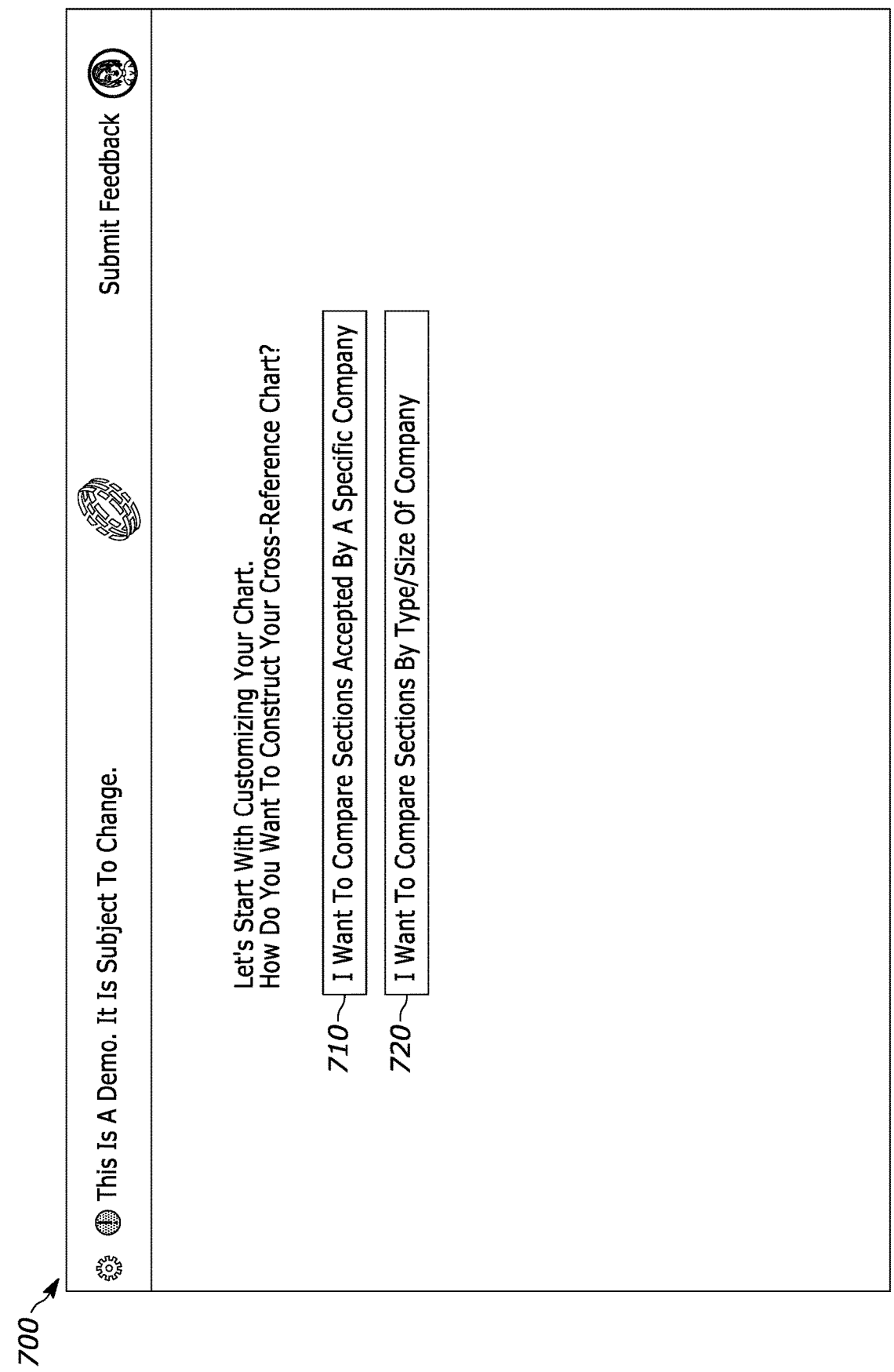
FIG. 7 is an additional depiction of an embodiment of the user interface of the disclosed system to show additional features of the cross-section chart builder tool which a user can access to compare market-standard document sections.

FIGS. 4-6 depict additional query options a user may select to narrow their search of legal document sections. For example, a user can select a date range section option 410, company title selection option 420, type of company selection option 470, a user's specific company selection option 430, a company size selection option 480, the type of document selection option 440, therapy area 450, and which agreement sections 460 they are looking for.

A company type selection 470 may be a small-cap entity (entities with less than approximately $2 billion market capitalization), mid-cap entity (market capitalization between $2-10 billion), large-cap entity (between $10-200 billion market capitalization), nano-cap entity (less than $50 million market capitalization), micro-cap entity (between $50-$250 million market capitalization), mega-cap entity (over $200 billion market capitalization), private entity, startup entity, university, non-profit, or government entity for example, although other company sizes or types are also contemplated.

If relevant, a user can also select a type of therapy area 450 to narrow the search. This section option is optional, and may only be utilized in specific user searches, such as for agreements with drug manufacturers or other entities which perform clinical trials or other related work.

The type of document or agreement 460 a user can search for may be, without limitation, any of the following: a licensing agreement, development agreement, supply agreement, quality agreement, commercialization agreement, development agreement intellectual property agreement, clinical trial agreement, settlement agreement, or any other commercial, corporate, or other legal or transactional agreement document between entities as would be understood by one of ordinary skill in the art.

Once a user selects the preferred parameters, the relational database 120 can calculate based on text embedded vector analysis, the most similar document sections to display to a user. The relational database 120 communicates with the memory storage unit 116 to identify the best fit candidate sections and the memory storage unit 116 communicates the identified section or sections to a user. The user may access the disclosed user interface and search the resulting section or sections via a laptop or desktop computer, a mobile device, or any other device capable of communicating with the relational database 120 and memory storage unit 116.

Figure 17:
FIG. 17 an additional depiction of an embodiment of the user interface of the disclosed system to show additional features of the section analysis tool which a user can assess to review market-standard sections of relevant legal documents.
Figure 18:
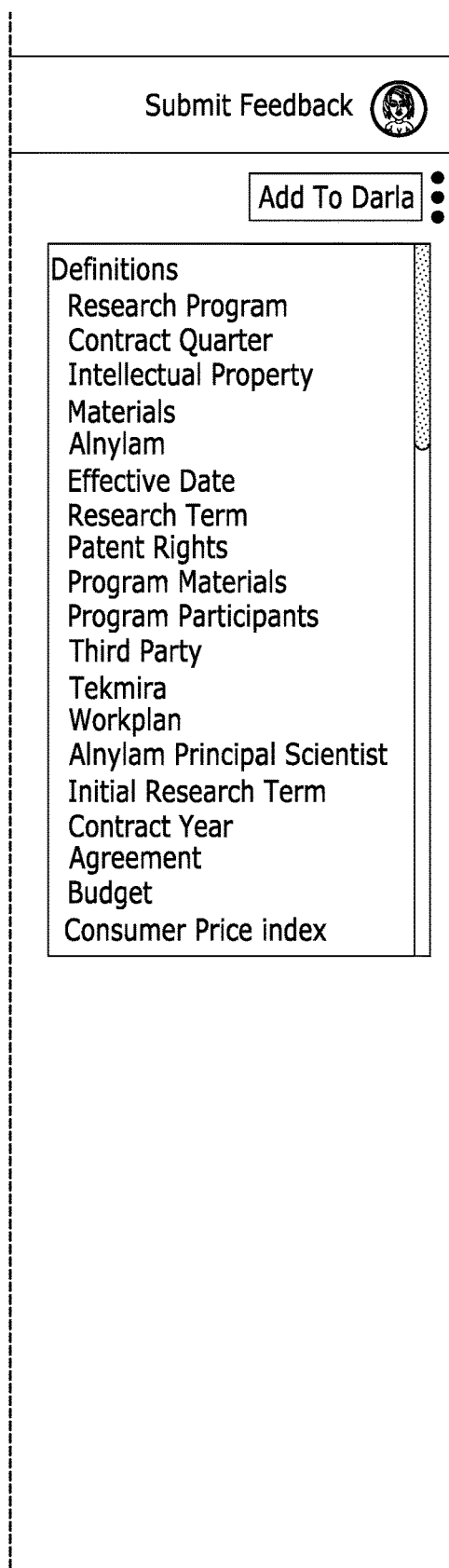
FIG. 18 an additional depiction of an embodiment of the user interface of the disclosed system to show additional features of the section analysis tool which a user can assess to review market-standard sections of relevant legal documents.

The disclosed system can deliver commercial, corporate, or transactional sections from the S3 storage unit 116 which are market current and based on a user's inputs and based on the relational values identified in the relational database 120. FIGS. 17-18 depict an embodiment of the display of sections 1710(a), 1710(b), 1810 a user can receive from the disclosed system based in a particular query.

Cross-Reference Chart

Alternatively, a user can elect to view a cross-reference chart via the cross-reference chart builder tool 700. A cross-reference chart builder 700 allows a user to compare features of targeted sections within a specific field, industry, or market sector to determine which section terms and sections are best suited for a particular use. In particular, a user can opt to compare specific sections from multiple companies within a targeted industry or specific sections each from an agreement where one target company is a party. To search for sections accepted by a specific company, a user can user a compare sections already known to have been accepted by a specific company 710 tool. To search sections by type of company, a user can select the compare sections by size/type of company tool 720. FIGS. 7-14 illustrate the cross-reference feature of the present disclosure. FIGS. 7-10 depict illustrative parameters and inputs a user can control or change to narrow or expand their search.

For example, a user may be initially prompted with an option to compare sections already known to have been accepted by a particular company in a previous commercial, corporate, or transaction agreement 710. This option may be preferred by a user drafting an agreement with a particular company. Insight into the specific language a company has agreed to in the past can inform a user to make strategic choices about which language to include in a novel agreement document with that same company. Alternatively, a user may elect to compare legal document sections by type or size of company 720.

Figure 11:
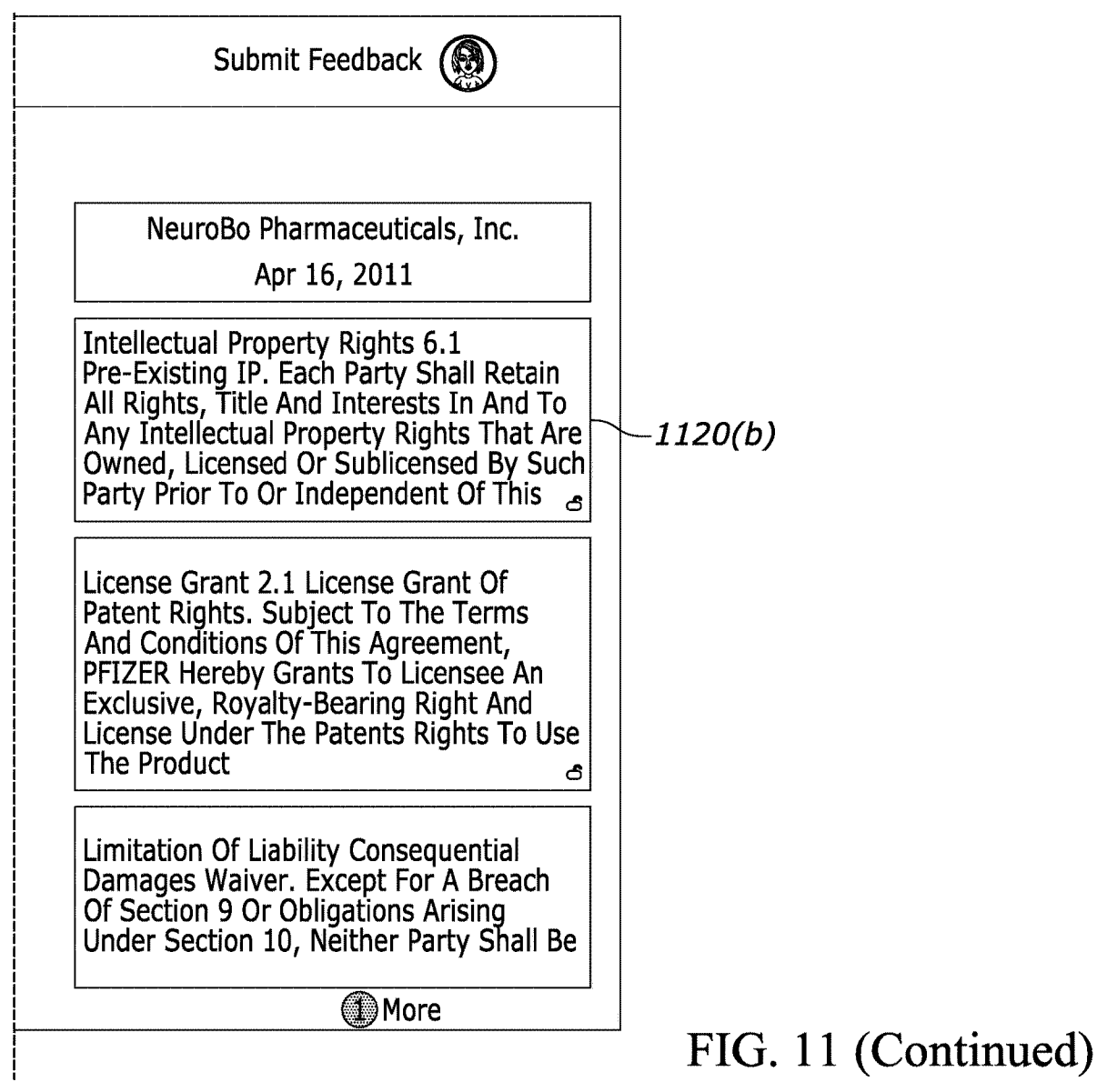

FIG. 11 illustrates an embodiment of an output from the cross-section chart builder 1100. As FIG. 11 shows, the cross-section chart builder 1100 feature allows a user to readily compare targeted sections 1120(*a*) (b) of a legal document across multiple already-existing agreements from a public database. As FIG. 11 shows, the cross-section builder tool 1110 can compare section inputs 1130(*a*) (b) with specific target company inputs 1110(*a*) (b). The specific sections displayed 1120(*a*) (b) in the cross-section chart builder 1110 results will depend on the user's inputs, the documents ingested into the system from a public database, and the weighted embedded vector scores stored in the relational database 120 and retrieved from the memory storage unit 116.

Figure 8:
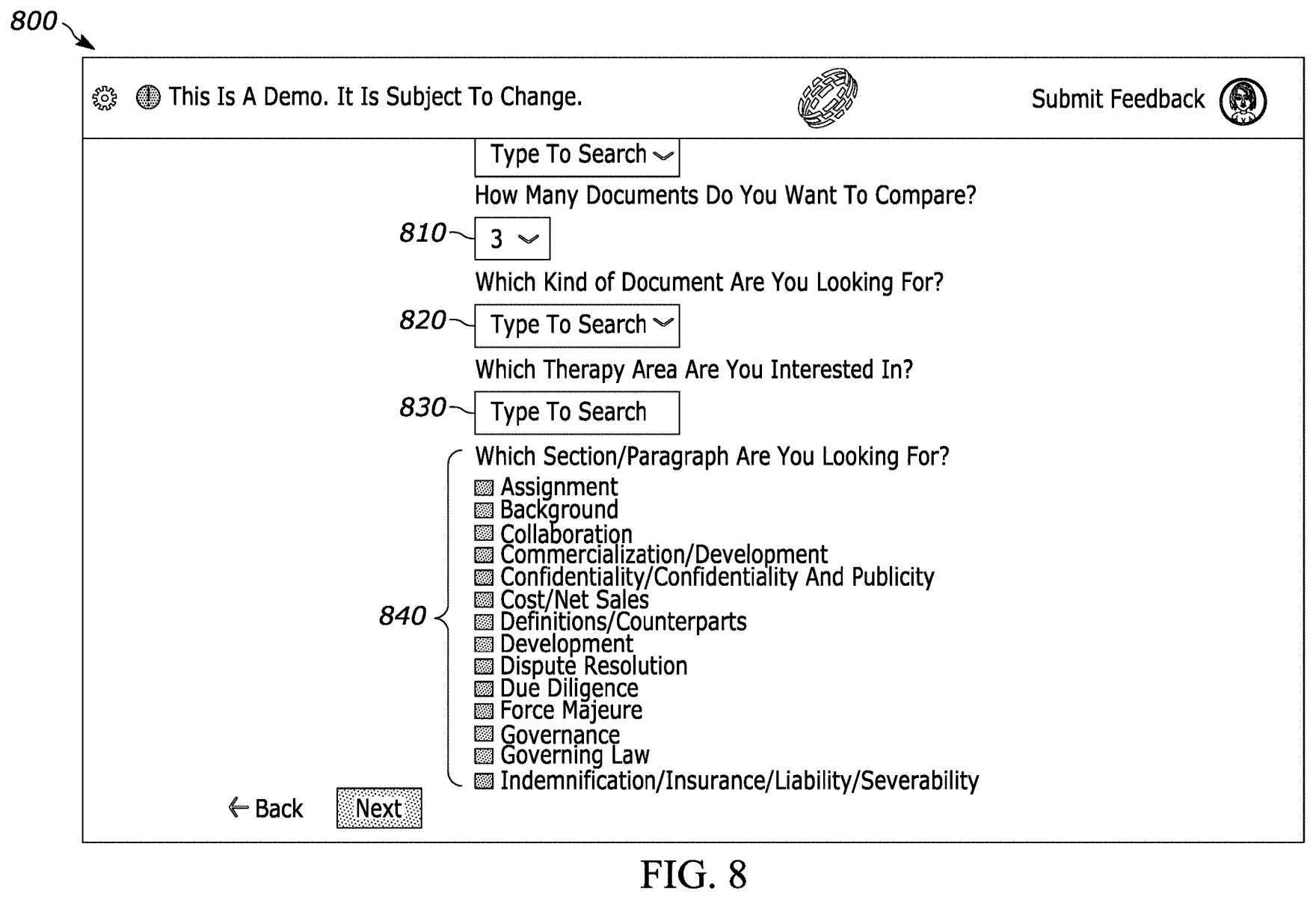
Figure 9:
FIG. 9 is an additional depiction of an embodiment of the user interface of the disclosed system to show additional features of the cross-section chart builder tool which a user can access to compare market-standard document sections.
Figure 10:
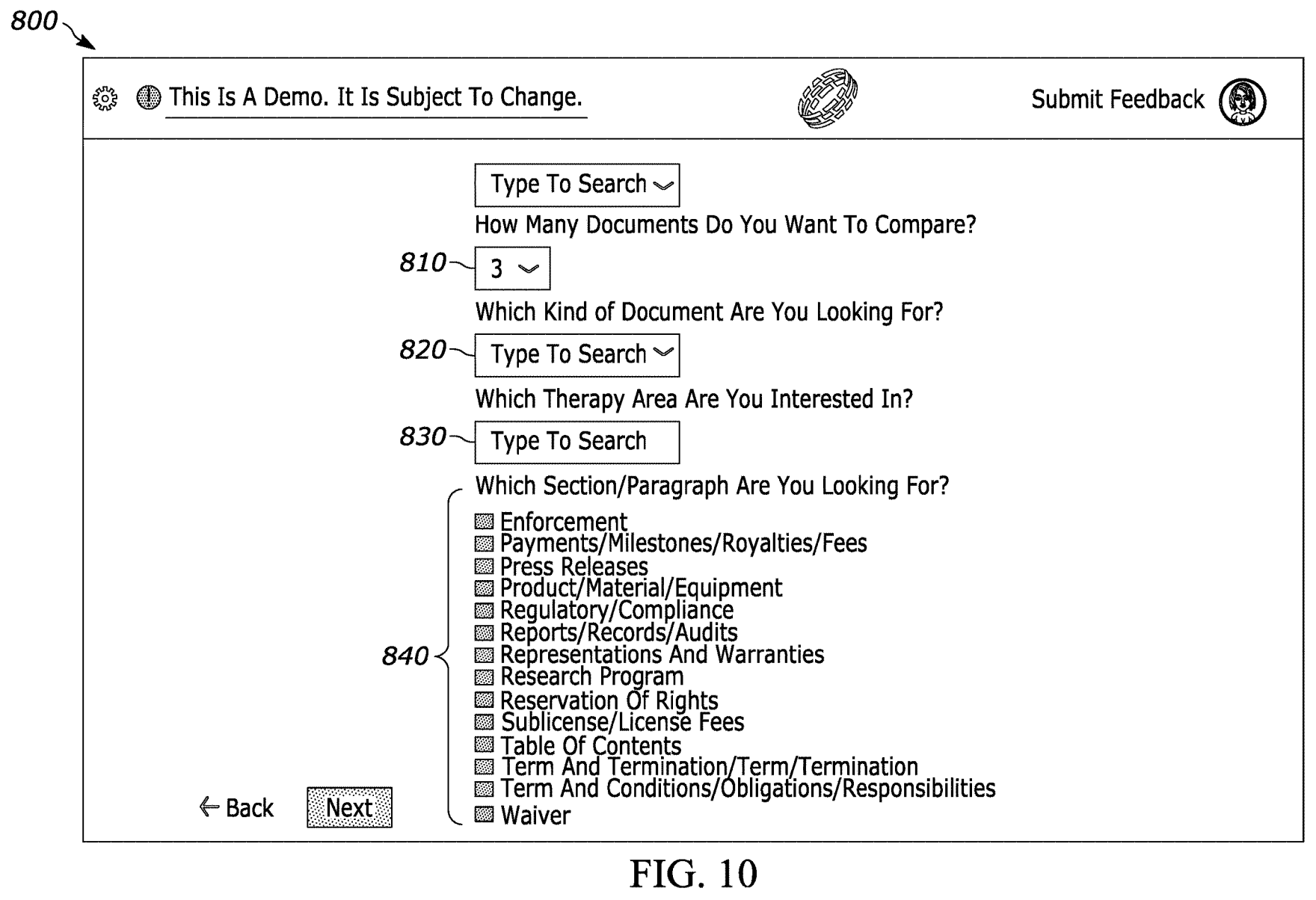

A user can input additional information to create a cross-reference chart. FIGS. 8-10 depict additional inputs for the cross-section chart builder. These inputs further tailor the generated results and may include the following, non-limiting parameters: how many documents/section a user wants to compare in the chart (via the document number tool 810), the kind of document to be compared (via the document kind tool 820), the type of therapy, if relevant, (via the therapy selection option 830) and the specific section search inputs 840 to be compared in a cross-reference chart.

The specific sections search inputs 840 may include any sections typically found in a commercial, corporate, or transaction agreement, as would be known by one of ordinary skill in the art, and which may include any of the following, non-limiting examples; assignment, background, collaboration, commercialization, development, confidentiality, costs, net sales, definitions, counterparts, dispute resolutions, due diligence, force majeure, governance, governing law, indemnification, insurance, liability, severability, intellectual property, introductions, collaboration, limitations of liability, manufacturing and supply, merger clause, notices, miscellaneous, patent usage or protection, enforcement, payments, milestones, royalties, fees, press releases, products, materials, equipment, research program, representations and warranties, reservations or rights, licensing fees, table of contents, term and termination, term, termination, terms and conditions, obligations, responsibilities, waiver, or any other section as may be included in a commercial, corporate, or transactional legal document as would be understood by one of ordinary skill in the art.

FIG. 11 is an illustration of a potential cross-section chart result 1100 showing multiple resulting sections 1120(*a*) (b). As FIG. 11 depicts, the disclosed system can present a user with recommendations showing sections 1120(*a*) (b) which have been accepted by specific companies or company types 1110(*a*)(*b*). The cross-section chart result in FIG. 11 shows document section titles 1130 along one axis and companies 1110 along another axis. In this way, a user can review and compare document sections 1120 between similar companies to identify the section and terms best suited to a particular use. A user can select any of the displayed sections 1120 in the cross-reference chart 1100 shown in FIG. 11 to obtain additional information about a particular section, term, agreement, or entity, as is shown in FIG. 12.

Figure 12:
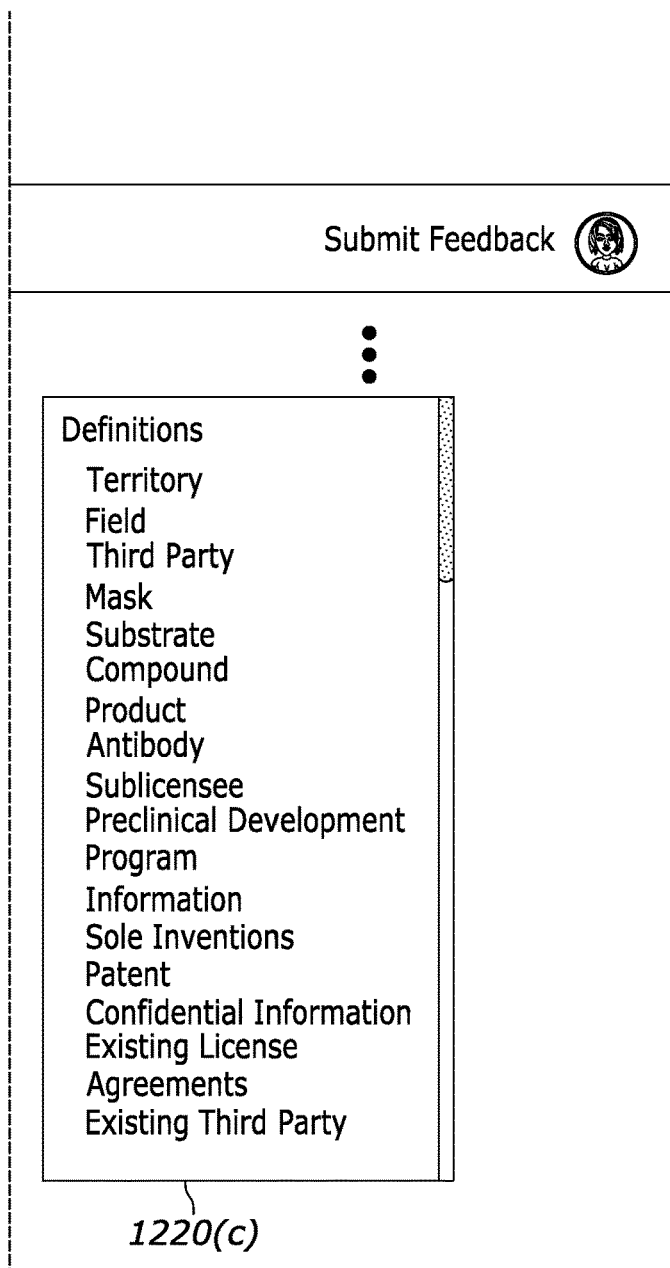
FIG. 12 is an additional depiction of an embodiment of the user interface of the disclosed system to show additional features of the cross-section chart builder tool which a user can access to compare market-standard document sections.

For example, FIG. 12 shows a display of a specific section 1210 identified in the cross-section chart builder 1200. A user can select a specific section 1210 of the cross-reference chart builder 1200 to analyze more closely a given section 1210 of a legal document. As FIG. 12 shows, the disclosed system includes links to defined terms 1220 in the document, which allow a user to link back to the underlying definitions from the source document.

Figure 13:
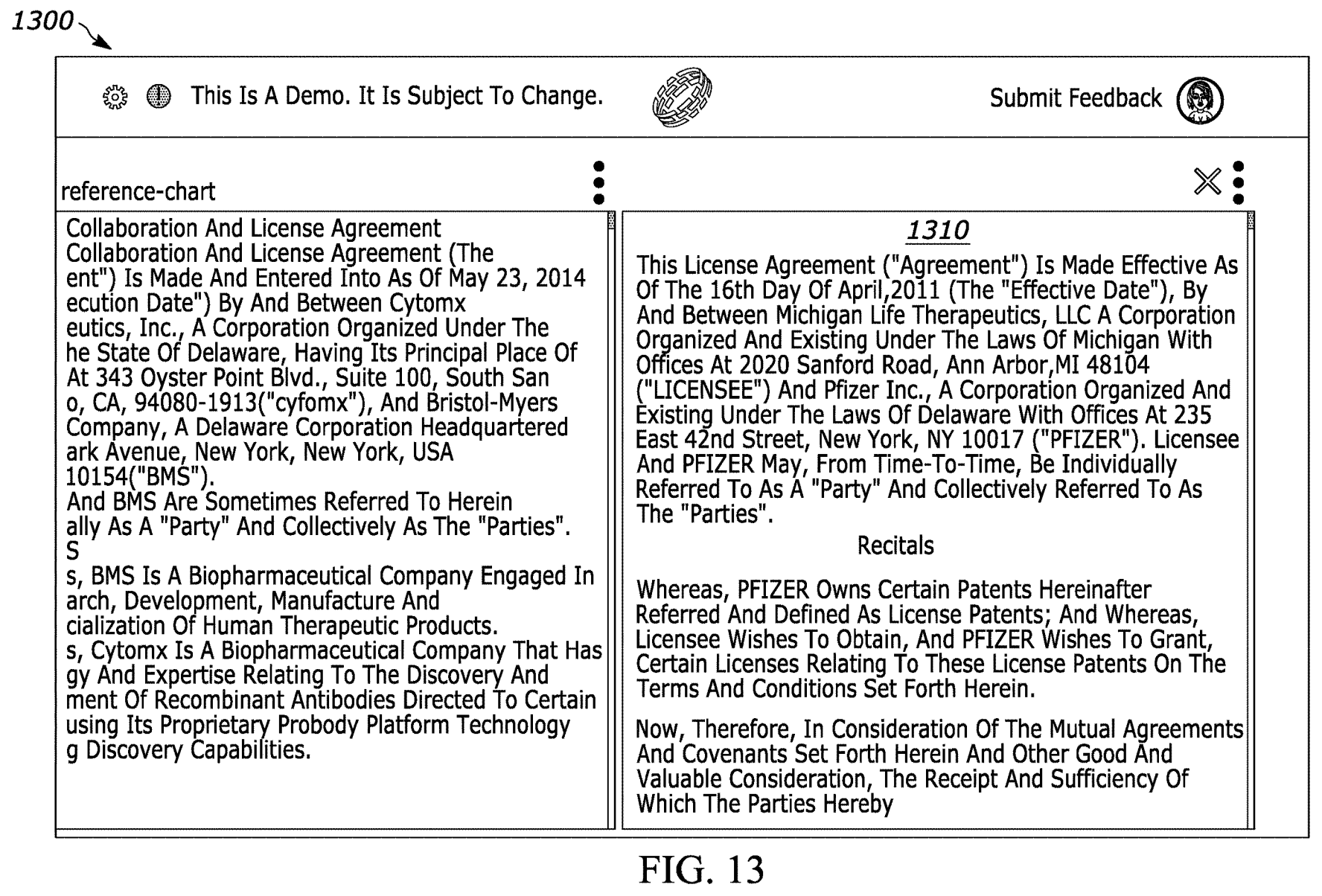

Importantly, the disclosed system allows a user to link to the underlying source document. So, for example, the disclosed system produced the cross-section chart shown in FIG. 11. A user can investigate the results shown in FIG. 11 further by selecting a specific section to review, as depicted in FIG. 12. Then, if selected, the disclosed system can present a user with the source document 1310 in its entirety, as depicted in FIG. 13.

FIG. 14 depicts an alternative embodiment, showing two or more license grant sections 1410 from the cross-section chart builder 1400. In this feature, a user can specifically compare two or more sections 1410 of interest across multiple already-existing documents. In this way, a user can easily review targeted sections 1410 of current, relevant legal documents to draft a novel agreement with the most current and market-standard sections and terms.

The disclosed system delivers sections from already-existing legal documents which were ingested from a public database, related, ordered, embedded in vector format, stored in a relational database 120 and linked to the source documents and individual sections in a memory storage unit 116. In this way, based on a user's prompts and the embedded relational information, the disclosed system can calculate the most similar sections and retrieve those documents or sections that are most relevant to a user.

Term Sheet Creator

Figure 16:
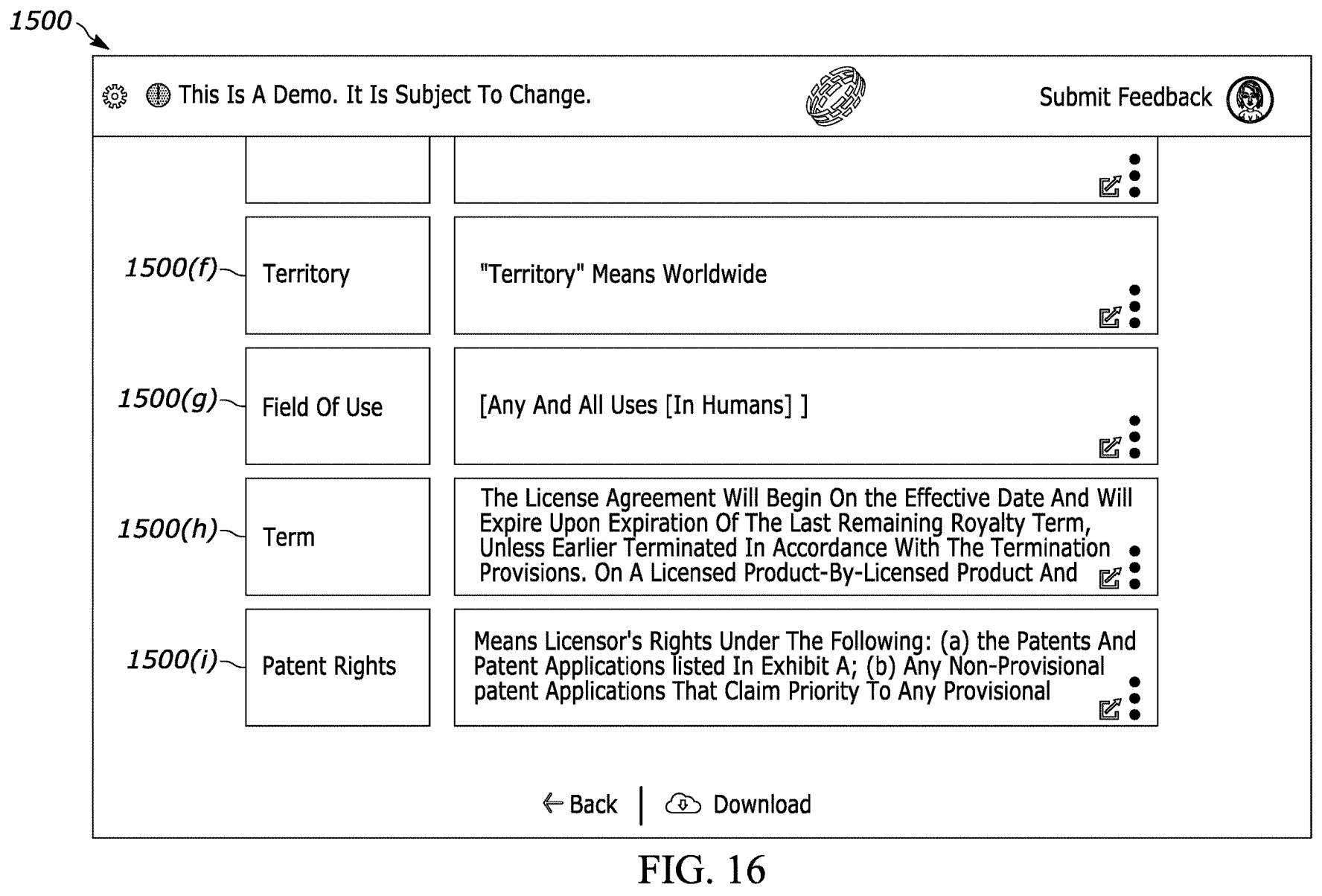

A user can utilize the disclosed system to generate a list of market-current terms for a term sheet to accompany a legal document using the disclosed term sheet creator. FIGS. 15-16 generally depict the disclosed system's output of relevant terms 1500. To utilize the term sheet creator 340, a user selects the "create a term sheet" option as depicted in FIG. 3. Based on a user's inputs, similar to the inputs disclosed for the section analysis 310 tool and the cross-reference chart builder 330 above, this disclosed system permits a user to add additional information to narrow the scope of a search. As with the section analysis tool 310 and cross-reference chart builder, these inputs may be, without limitation, any of the following: date range, company name, type, or size, industry or market specific fields, specific document input search sections or any other inputs disclosed herein or as would be understood by one of ordinary skill in the art. The disclosed system can produce a term sheet chart as depicted in FIGS. 15-16. The terms identified by the disclosed system are retrieved from the memory storage unit 116 based on the embedded vectors stored in the relational database 120.

Data Room

Additionally, a user can assess a disclosed data room 320. The data room stores relevant source documents ingested from a public database, such as, EDGAR. The benefit of this feature of the disclosed system and method is that a user can review an entire source document. For example, after documents from a public database have been ingested, analyzed, ranked, and related, the disclosed system and method may recommend individual portions of a specific ingested document to a user for a particular use. For example, if a particular section or definition is identified from the section analysis 310 tool, the cross-reference chart builder 330 or the term sheet creator 340, a user can elect to review the underlying source document. The data room allows a user to do so. After the original documents have been ingested from the public database, analyzed, classified, and embedded in vector format in a relational database 120, the underlying document is stored in the memory unit 116 and can be accessed based on the calculated results from a user's input.

One feature of the disclosed system and method is that any section that gets recommended to a user is linked to a copy of the underlying source document, which is stored and is viewable in the disclosed data room 320. It is critical that a user know the source of a recommended section. By allowing a user to investigate the source of a recommended section, the user can confirm that the source document is appropriate for the given task. This can save a user time, especially if the underlying document is a perfect or near perfect template for a given use. Alternatively, the ability to review an underlying document lets a user confirm if that document is a bad fit for a given use. The data room 320 offers users an additional means to create market-current documents or other accurate and reliable documents. By linking every recommended element to its source document, a user is empowered to access and review any underlying source document which may be relevant in a given circumstance. This feature of the disclosed system therefore can eliminate the need for a user to seek out new comparable documents by linking any recommended section to that section's corresponding source document. This increases the efficiency of document drafting and provides a user with yet another piece of information which can aid the drafting process. The disclosed data room 320 therefore, acts as both a tool and a check on any given recommendation.

Finally, the ability to confirm the underlying document builds confidence in the recommendations generated by the disclosed system and method. Any time AI/ML systems are implemented to create or recommend content, there is always a concern that the AI/ML will make a mistake. The ability to access and review source documents in the disclosed data room 320 serves to reduce this concern and to boost confidence in the recommendations provided by the disclosed system.

Although the present invention and its advantages have been described in detail, it should be understood that various changes, substitutions, and alterations can be made herein without departing from the spirit and scope of the invention as defined in the appended claims. Having thus described in detail preferred embodiments of the present invention, it is to be understood that the invention defined by the above paragraphs is not to be limited to particular details set forth in the above description as many apparent variations thereof are possible without departing from the spirit or scope of the present invention.

What is claimed is:

1. A method of creating a term sheet of market-standard terms for a transaction document of a particular type comprising:
ingesting a plurality of agreed-to transaction documents from a public database external to a user's personal transaction database, the agreed-to transaction documents comprising common contract concepts, the common contract concepts comprising contract terms related to the contract concept;
ingesting metadata relating to each of the agreed-to transaction documents;
training a machine learning model on the plurality of ingested documents and contract concepts;
using one or more computer processors programed to run an artificial intelligence program based on the machine learning model to generate a plurality of vectors for one or more contract terms found in one or more of the transaction documents;
using the machine learning model to relate the plurality of vectors to each other in a contract term and contract concept database by calculating a similarity coefficient between the vectors, the similarity coefficient calculated based on a predicted relationship between the text of the contract terms;
ranking, by the one or more processors, the set of contract terms based on the similarity coefficients of the contract term search results to create a set of market-standard contract terms related to each contract concept for one or more types of transaction document; and
outputting to the user, in response to a query for a document type, a market-standard set of contract terms.

2. The method of claim 1, further comprising converting the ingested documents into portable document format.

3. The method of claim 1, further comprising using a classifier to identify document elements within the ingested documents.

4. The method of claim 3, further comprising using a text extractor to separate the document elements.

5. The method of claim 3, wherein the document elements comprise document definitions.

6. The method of claim 5, further comprising, cleaning data obtained from the definitions.

7. The method of claim 3, wherein the document elements are a set of document section titles, the set comprising individual document section titles.

8. The method of claim 7, wherein the individual document section titles are grouped to determine the similarity of individual document section titles within the set of document section titles.

9. The method of claim 1, further comprising storing the ingested documents in an internal database.

10. A non-transitory computer-readable storage medium including computer-readable instructions configured to be executed on a processor, causing the processor to execute the steps of:
ingesting a plurality of agreed-to legal documents from a public database external to a user's personal transaction database, the agreed-to legal documents comprising common legal concepts, the common legal concepts comprising legal terms related to the legal concept;

ingesting metadata relating to each of the agreed-to legal documents;
converting the ingested documents into portable document format;
training a machine learning model on the plurality of ingested documents and legal concepts;
using a classifier to identify document elements within the ingested documents;
using a text extractor to separate the document elements;
using one or more computer processors programed to run an artificial intelligence program based on the machine learning model to generate a plurality of vectors for one or more legal terms found in one or more of the legal documents;
using the machine learning model to relate the plurality of vectors to each other in a legal term and legal concept database by calculating a similarity coefficient between the vectors, the similarity coefficient calculated based on a predicted relationship between the text of the legal terms;
ranking, by the one or more processors, the set of legal terms based on the similarity coefficients of the legal term search results to create a set of market-standard legal terms related to each legal concept for one or more types of legal document;
outputting to the user, in response to a query for a document type, a market-standard set of contract terms; and
storing the ingested documents in an internal database.

* * * * *